Dec. 15, 1959 H. F. PATTERSON 2,916,932
POWER TRANSMISSION
Filed March 9, 1939 7 Sheets-Sheet 3
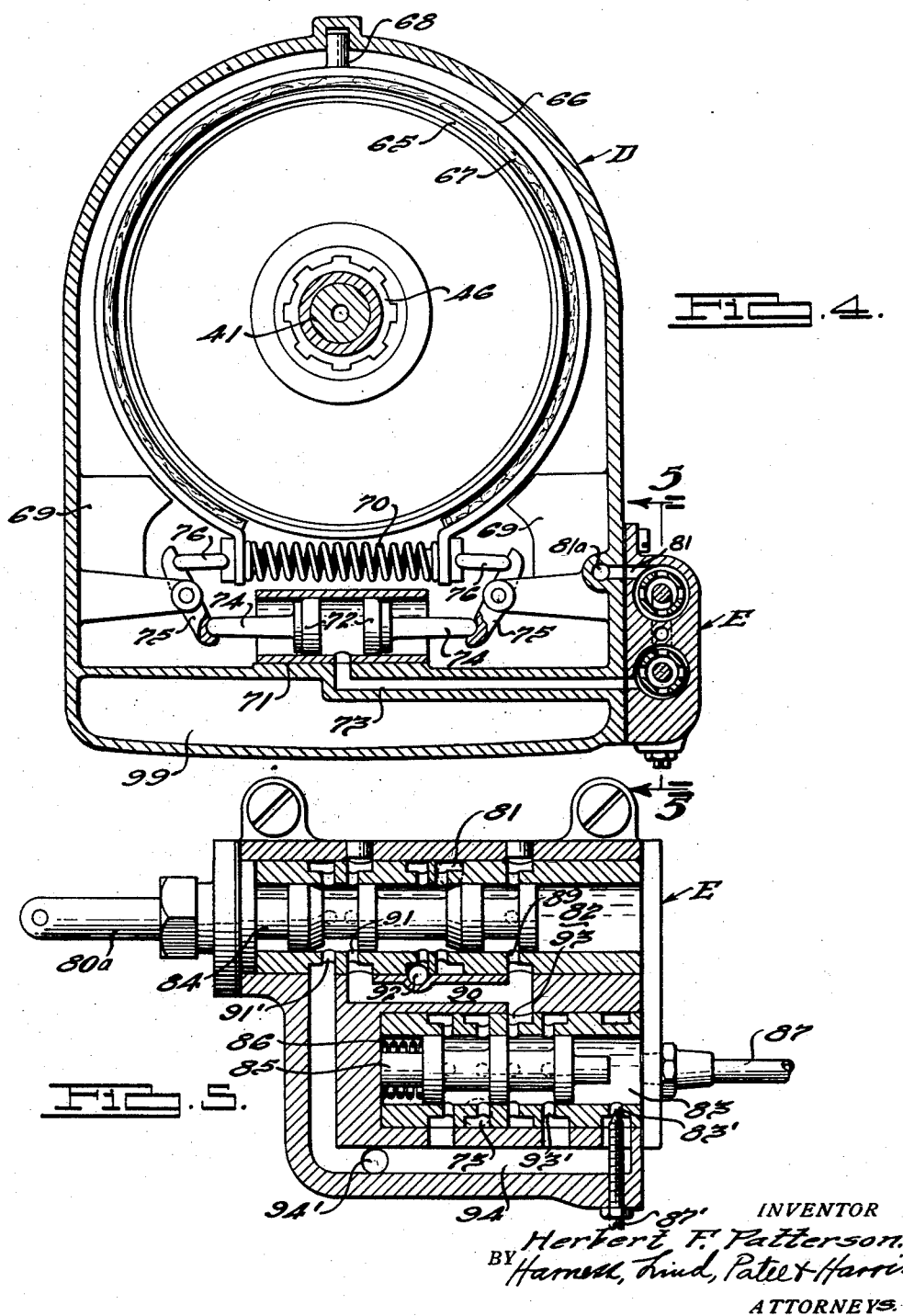
INVENTOR
Herbert F. Patterson.
BY Harness, Dind, Patet Harris
ATTORNEYS.

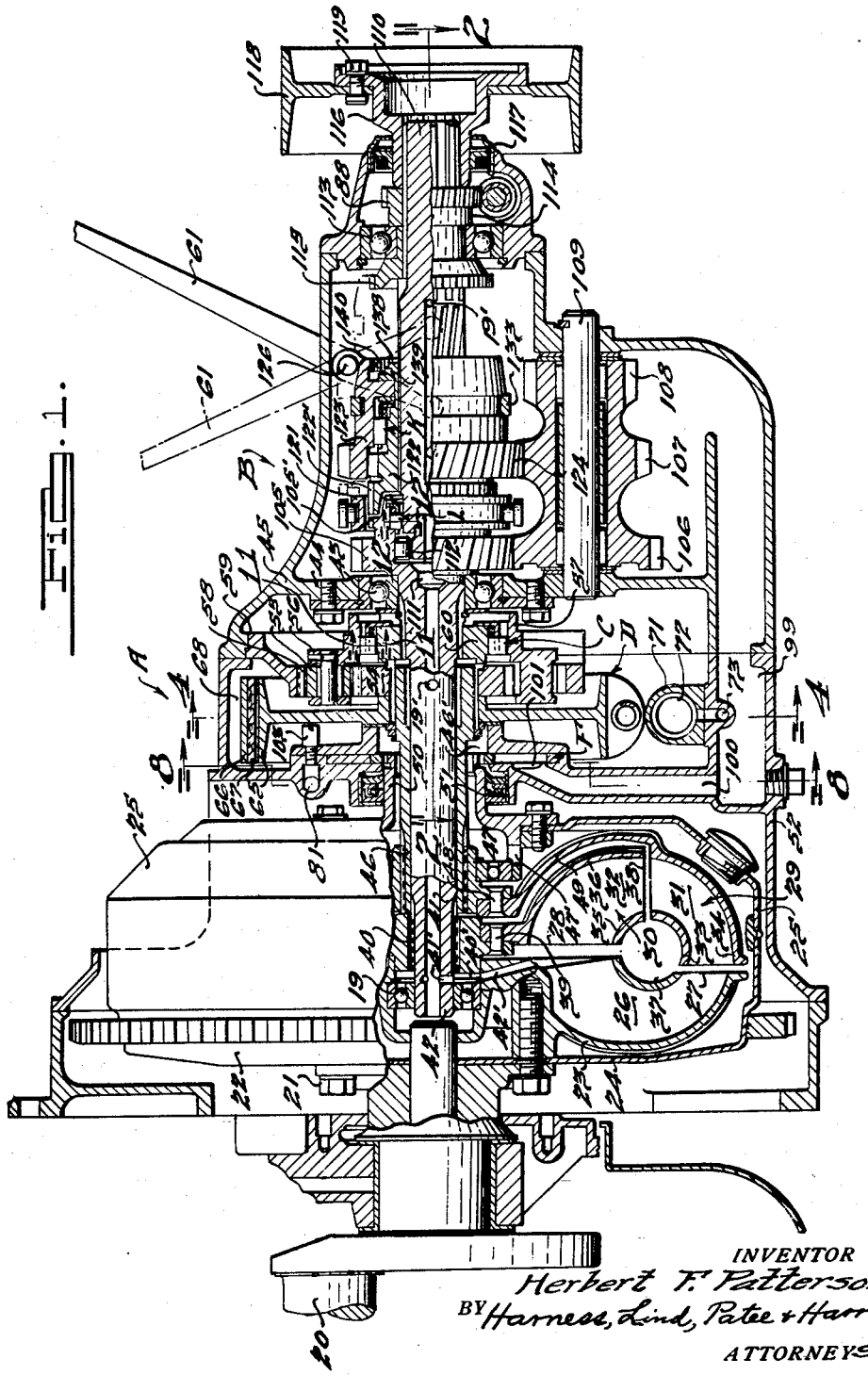

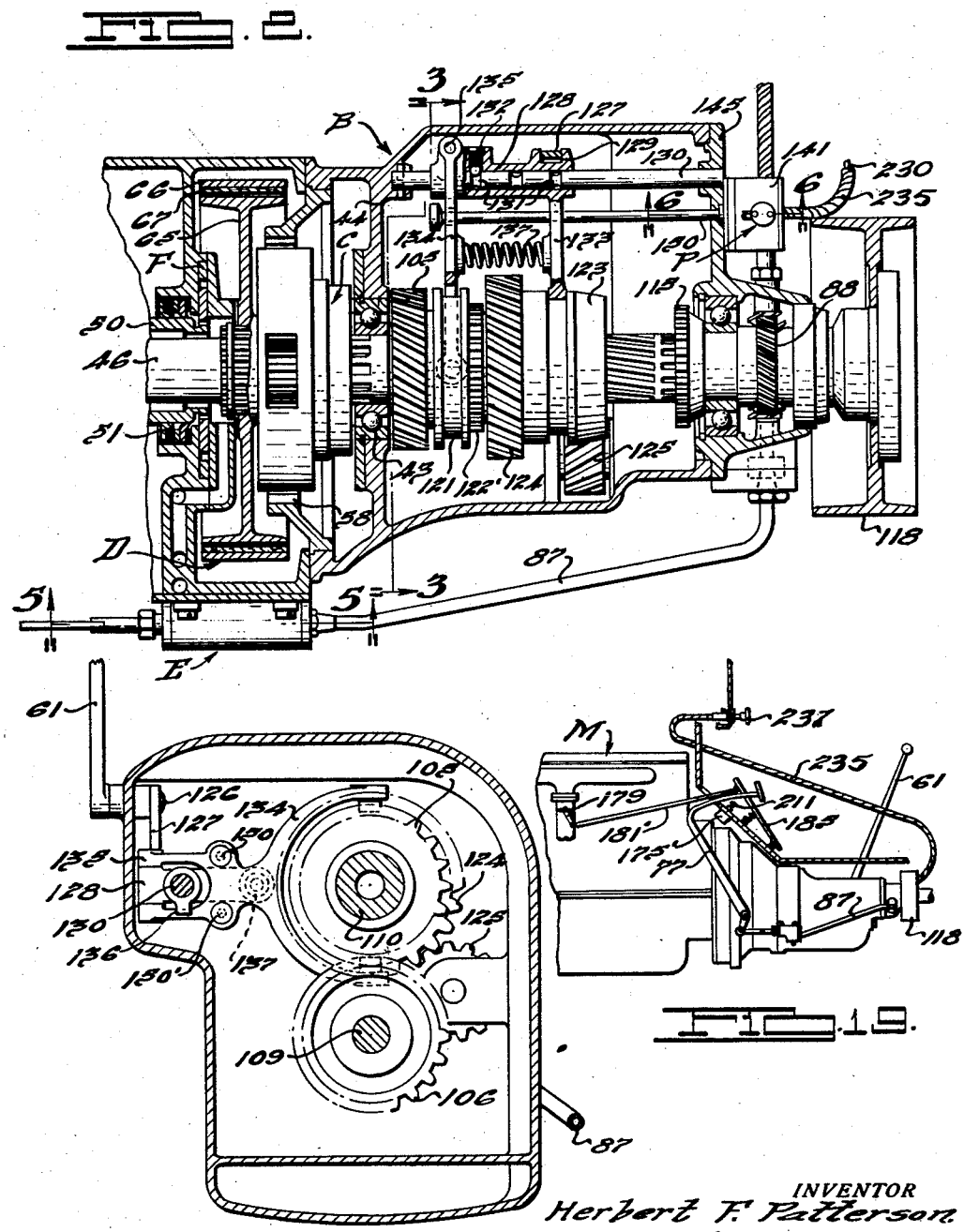

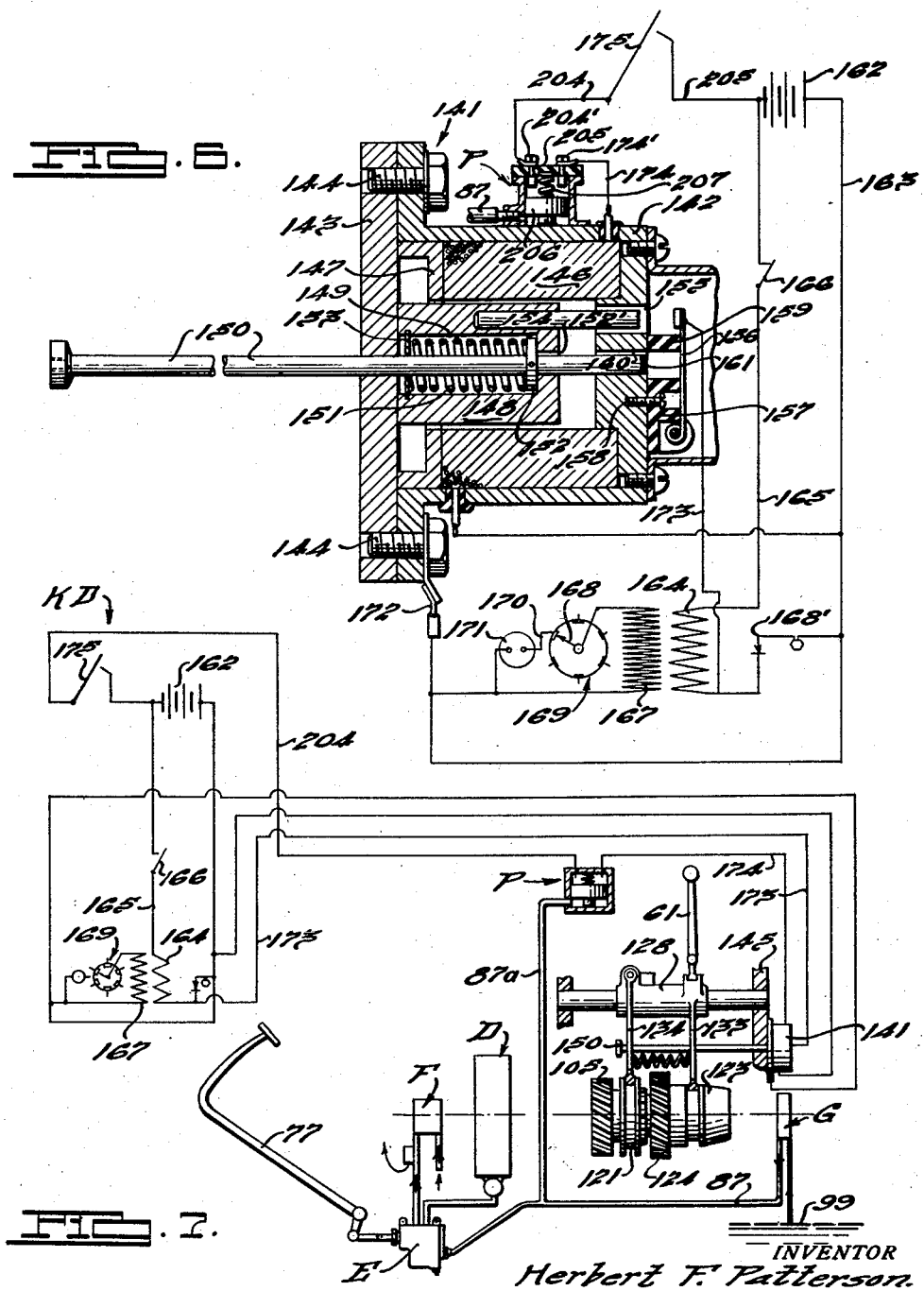

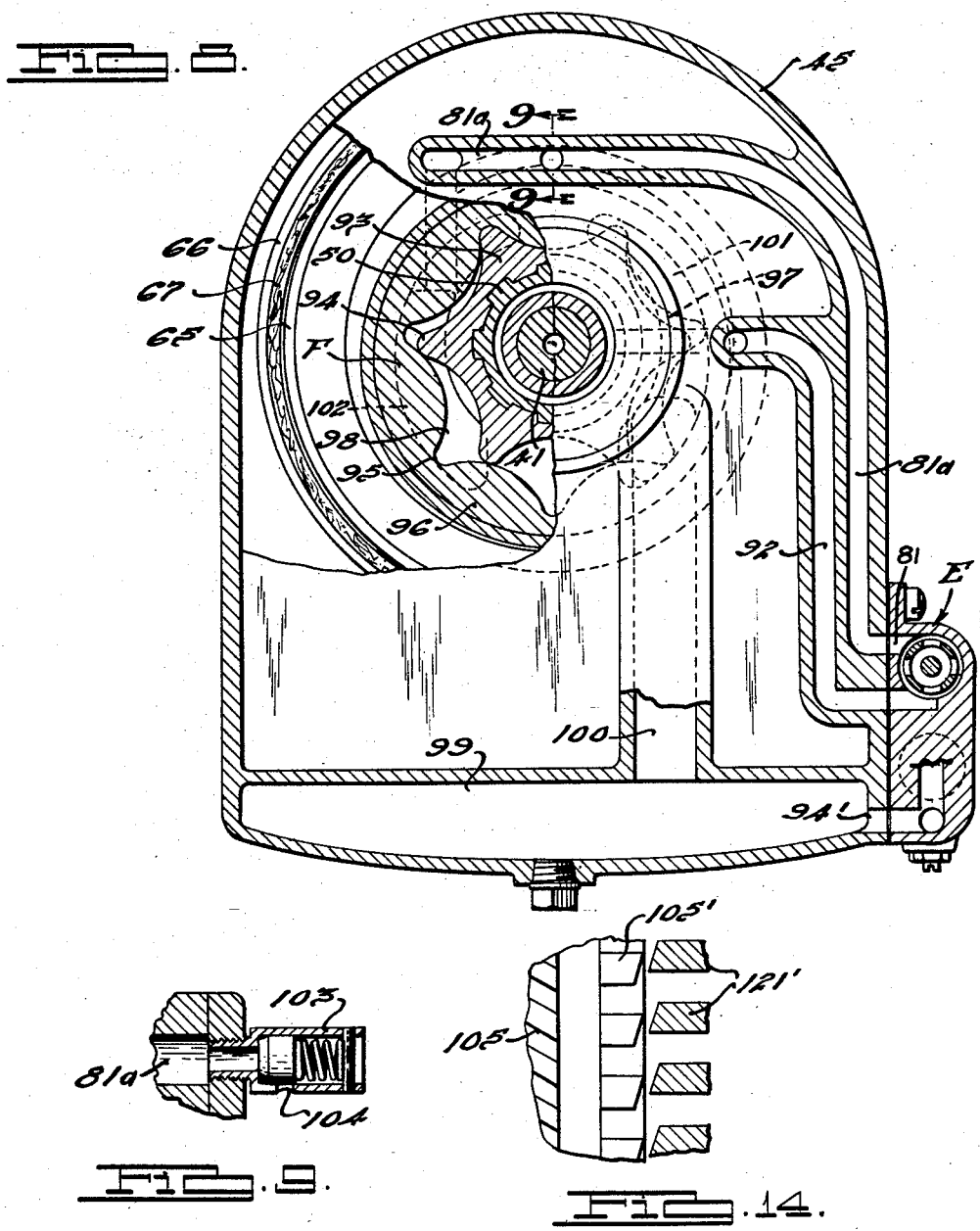

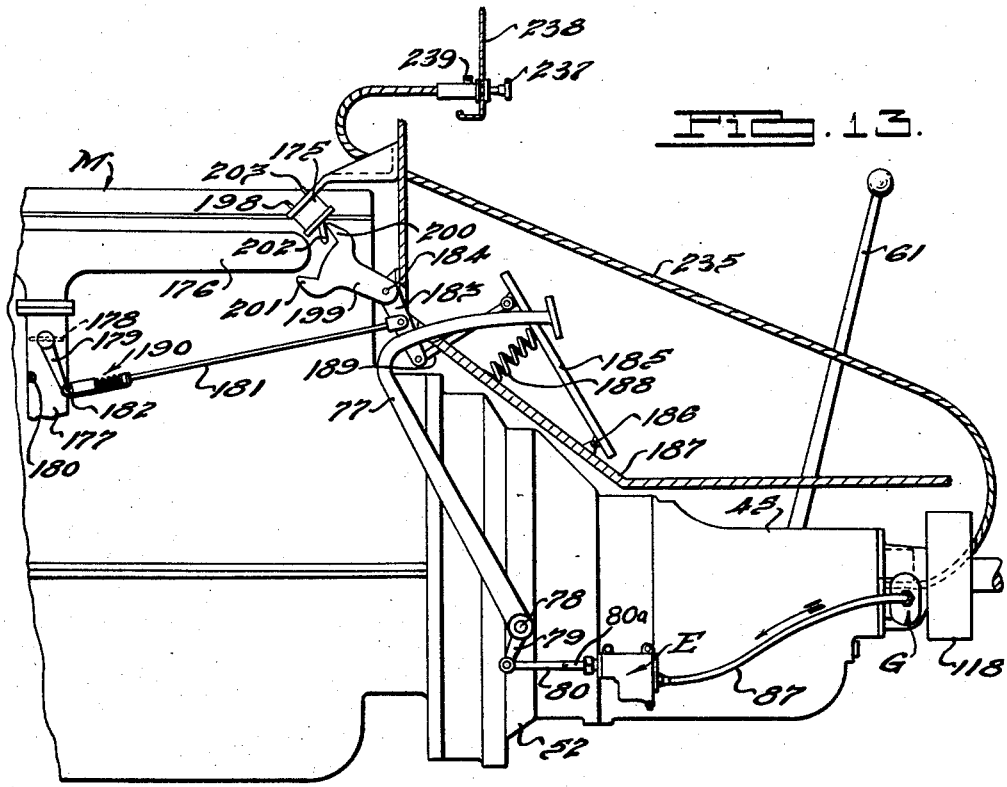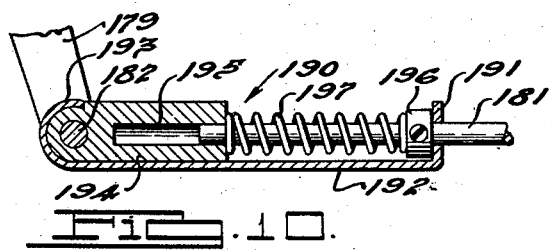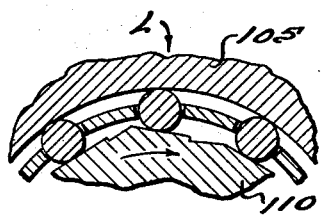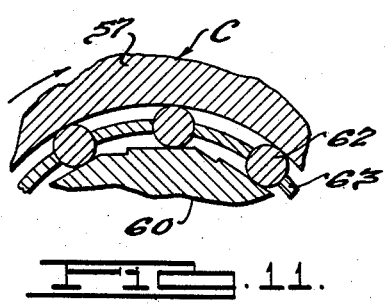

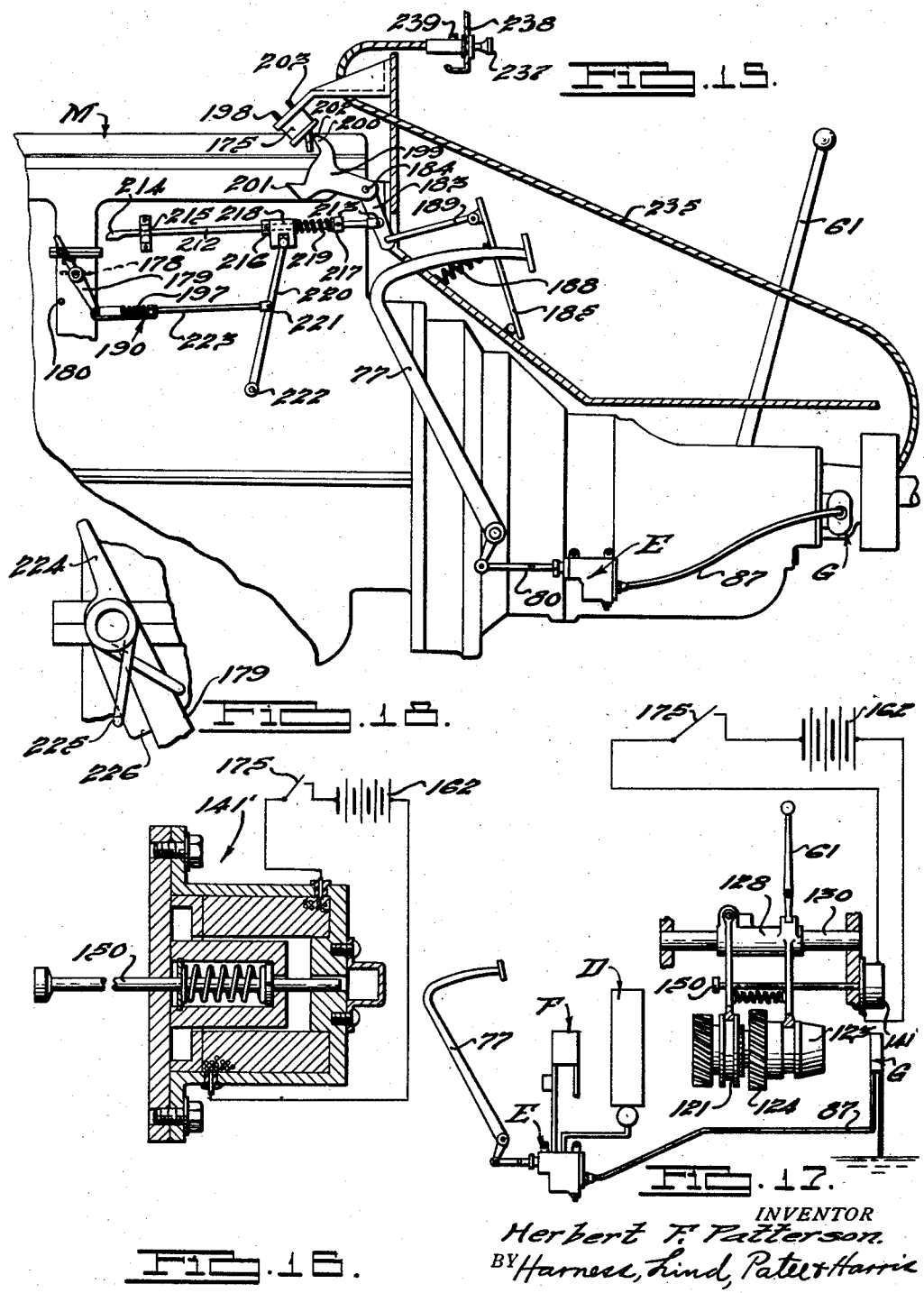

United States Patent Office 2,916,932
Patented Dec. 15, 1959

2,916,932

POWER TRANSMISSION

Herbert F. Patterson, St. Clair Shores, Mich., assignor to Chrysler Corporation, Highland Park, Mich., a corporation of Delaware Application March 9, 1939, Serial No. 260,801

96 Claims. (Cl. 74—472)

This invention relates to power transmissions of the type especially adapted for transmitting power for driving a motor vehicle.

One object of the invention is to provide an improved system of motor vehicle drive control embodying more desirable flexibility of speed ratio changing, improved ease of operation, better economy of driving; also many features of vehicle drive control which adapt themselves to driving conditions at any time.

Heretofore it has been customary in many motor vehicle transmission systems to employ a change speed transmission of general standard type, giving three forward speed ratios including direct and a reverse drive, together with an overdriving mechanism behind the standard transmission so that the drive passes first through the standard transmission and then to the overdrive mechanism. In such systems the usual relatively slow speed axle ratio of about 4.3 is customarily used. This well known overdrive mechanism provides an overrunning direct drive which is releasable, on release of the accelerator pedal to slow down the engine and the attainment of a predetermined vehicle speed such as forty miles per hour, to automatically engage a centrifugal clutch to effect an overdrive through a planetary gear set. When the vehicle speed in overdrive drops down to a predetermined speed at which the overdrive control clutch will automatically release, generally around 25 miles per hour, the drive is then automatically resumed in direct. This known arrangement is advantageous in that the engine may be run at a slower speed than the propeller shaft with resulting fuel economy, reduction in engine wear, quieter operation of mechanical parts and other known advantages.

With the foregoing known overdrive arrangement, there is lacking a desired flexibility of drive control in that the overdrive is effective only on attaining a predetermined vehicle speed and once engaged cannot be released until the car speed has dropped as aforesaid. Such arrangement prevents the realization of overdrive economy for city driving which is ordinarily 75% of average driving conditions. There is also the disadvantage in that, when in overdrive, the unfavorable speed ratio drive prevents rapid car acceleration as is frequently desirable in passing another car or where for other reasons the engine is called on to suddenly deliver greater torque or to rapidly accelerate the car. If the overdrive cut-in speed were reduced to, say 20 miles per hour, to enable more economical running in the city, then the resulting unfavorable speed ratio would give sluggish performance for rapid acceleration in traffic conditions.

Further disadvantages of the aforesaid conventional overdrive mechanism are that a very sturdy gearing is required because it is behind the standard type transmission wherein torque can be multiplied; also the requirements for mechanism to render the direct drive overrunning clutch inoperative to enable driving the vehicle in reverse.

The present transmission system overcomes the disadvantages of the aforesaid known type of overdrive mechanism and offers many advantages of structure, drive functions and economy not heretofore possible.

The present invention preferably employs certain fundamental arrangements of parts such as the use of an underdrive or reduction drive of other types, together with a relatively fast axle ratio in the neighborhood of 3.5 by way of example.

While the underdrive mechanism may have any desired number of speed ratio drives or changes, it is preferable to provide an arrangement whereby the drive through this mechanism is either direct viz., a speed ratio of 1 to 1, or an underdrive viz., a speed reduction less than 1 to 1. More particularly, the underdrive mechanism is preferably so arranged that during normal car running the drive therethrough is a direct drive, although the underdrive is obtained at will and may be obtained, if desired, during initial acceleration of the car from standstill thereby obtaining the advantage of more powerful and faster car acceleration.

The direct drive offers advantages of quiet running and high economy for city as well as country driving conditions, the control system being such that the underdrive may be immediately brought into action at any time without shock or jolt to the passengers or the parts of the driving mechanisms. Furthermore, the underdrive mechanism is operable at will from the underdrive to the faster drive, such as direct, without shock or jolt.

The present arrangement provides an underdrive mechanism which employs gearing of the standard cylindrical constant mesh type for obtaining the underdrive ratio since this general type of gearing offers many advantages such as low cost, compactness and ease of control.

A fluid coupling of the multiple segment type is preferably employed for providing a drive connection between the engine and the underdrive mechanism although the underdrive transmission may be used in conjunction with other forms of clutches such as the ordinary plate-type friction clutch for releasing the drive between the engine and underdrive mechanism.

A fluid coupling is however employed by preference since, among its advantages are long life without wear since the circulating fluid provides the drive connection; inherent slip which accommodates the use of a relatively fast axle to great advantage since the engine can rapidly accelerate up to its maximum torque ahead of the parts driven therefrom, thereby increasing what is known as car performance or accelerating ability; smooth car getaway largely because at lower speeds the cushioning effect of the coupling is highest; elimination of rattle and backlash noises through the whole car driving mechanism and making highly accurate fits of parts less necessary since the engine torque impulses are not transferred back to the driven parts owing to the drive taking place through a liquid medium; reduction in the number of speed changes in the transmission because of the slip characteristics of the coupling; elimination of wear as in the facings of conventional friction clutches; prevention of damage to driven parts of the car mechanism making it possible to use lighter and cheaper structure because of the softness of the fluid clutch action making abuse of the parts impossible; provision for safer and easier driving on slippery pavement because of the gentle acceleration and retardation characteristics; provision for safety feature if the engine should stall on a hill since the engine may be started without the driver declutching or removing his foot from the brake pedal; making unnecessary the driver holding his foot on the usual clutch pedal while the car is stopped in traffic; and providing for increased car performance without enlarging engines thereby offering lower weight and cost together with increased oil and fuel economy, and increased engine life.

The fluid coupling employed in conjunction with the present invention is of the multiple segment type allowing variation in engine torque delivered to the underdrive transmission mechanism. It is to be understood, however, that the underdrive mechanism about to be described may be used in conjunction with other types of fluid couplings as well as with a conventional friction clutch or other equivalent means for connecting the engine crankshaft therewith.

A further object of the invention resides in the provision of improved controls for the manipulation of fluid coupling drives, as well as in the novel combination of parts disclosed.

In the accompanying drawings in which like reference characters indicate corresponding parts in the following description:

Fig. 1 is a vertical sectional elevational view through the improved power transmission embodying a multiple segment fluid coupling and torque conversion unit, and an underdrive gear set.

Fig. 2 is a detail sectional view through the line 2—2 of Fig. 1.

Fig. 3 is a detail sectional view through line 3—3 of Fig. 2.

Fig. 4 is a detail sectional view through line 4—4 of Fig. 1.

Fig. 5 is a detail sectional view through line 5—5 of Fig. 2 and line 5—5 of Fig. 4.

Fig. 6 is a combined detail sectional and diagrammatic view taken along the line 6—6 of Fig. 2 and showing the wiring circuit of the kick-down control unit and ignition interrupting mechanism.

Fig. 7 is another diagrammatic view of the wiring circuit of the kick-down underdrive control and ignition interrupting mechanism.

Fig. 8 is a detail sectional view through the line 8—8 of Fig. 1.

Fig. 9 is a detail sectional view through the line 9—9 of Fig. 8.

Fig. 10 is a detail sectional view of the end of the throttle valve control of Fig. 13.

Fig. 11 is a detail sectional view through line 11—11 of Fig. 1.

Fig. 12 is a detail sectional view through the line 12—12 of Fig. 1.

Fig. 13 is a fragmentary elevational view of the vehicle motor and transmission unit showing certain elements of the control mechanism.

Fig. 14 is an enlarged fragmentary sectional view of the underdrive coupling mechanism.

Fig. 15 is a view like Fig. 13 showing a modified form of the control mechanism.

Fig. 16 is a sectional view of the kick-down solenoid used with the control mechanism of Fig. 15.

Fig. 17 is a view like Fig. 7 showing the simplified circuit used with the modified control mechanism of Fig. 15.

Fig. 18 is an enlarged view of the upper end of the throttle control lever of Fig. 15, and, Fig. 19 is a view like Figs. 13 and 15 showing a further modification of the control mechanism.

In the drawings, reference character 20 represents a power driving shaft such as a crankshaft of a motor vehicle engine, this shaft being connected at 21 with the flywheel 22. The flywheel carries the impeller member 23 of a fluid coupling which together with a planetary gearset provides a torque conversion unit generally designated by the letter A, this impeller comprising inner and outer similarly dished cover plates 24 and 25 between which extend the circumferentially spaced radially arranged vanes 26. The cover plate 25 in this instance is formed as a part of the flywheel 22. The spaces between adjacent vanes provide passages for a suitable fluid, such as oil, entering at 27 and curving outwardly around member 23 for discharge at 28.

The fluid delivered by impeller 23 passes successively to a plurality of segmental runner members and, while these may be more than two in number, I have illustrated in the drawings only two runner segments comprising a primary or intermediate runner 29 and a secondary or final driven runner 30. Where more than two segmental runners are employed, any two adjacent segments in the direction of fluid circulation may be deemed respectively as the primary and secondary runners, preferably the last two of any such series. The runner segments 29 and 30 have radial vanes 31 and 32 corresponding in arrangement to the vanes 26. Vanes 31 are disposed between covers 33, 34 and vanes 32 extend between covers 35, 36, the arrangement being such that the fluid is circulated, during rotation of shaft 20, around the annular vortex chamber 37 in passing from the impeller 23 to runner segment 29. The fluid is delivered at 38 from runner segment 29 to runner segment 30 as will be readily apparent.

The secondary runner segment 30 is mounted at 39 on a hub 40 which is drivingly secured to the primary or intermediate driven shaft 41, the forward end 42 of which is bearinged in the hollow hub of member 23. Shaft 41 extends rearwardly through a bearing 43 carried by the wall 44 of the gear casing 45 adapted to house gearing B. Gearing B comprises forward and reverse gearing as well as underdrive reduction gearing which will be described later on in the specification.

Rotatively journaled on shaft 41 is a hollow shaft 46 drivingly mounting the hub 47 connected at 48 with a plate 49 which is an extension of cover 34 for supporting runner segment 29. Flywheel 22 carries a rear enclosure member 25 for the fluid coupling, the inner end portion of member 25 completely surrounding shaft 46 and having a fluid seal 51 fastened to the gear casing 52.

Hollow shaft 46 drivingly carries a sun gear 54 meshing with a plurality of planetary pinions 55 having a carrier 56 formed with a cylinder 57 providing the outer element of an overrunning clutch C. Pinions 55 mesh with an internal gear 58 non-rotatably secured at 59 to the casing 45. Clutch C (see Fig. 11) further includes the inner cam element 60 fixed to shaft 41. Clutch rollers 62 spaced by the cage 63 control the overrunning and clutching action between elements 57 and 60, it being understood that cam 60 may overrun cylinder 57 in a clockwise direction.

In order to expedite the shifting of the forward and reverse gears of the gearing B, especially when the idle of the engine is relatively high, means has been provided for relieving the engine acting through the fluid coupling comprising a brake mechanism D.

Drivingly fixed to hollow shaft 46 is a brake drum 65 (see Figs. 1 and 4) and surrounding this drum is a contractible band 66 having a friction brake lining 67.

Manually operable power actuated means has been provided to control the operation of brake D. The brake band 66 is anchored to the casing by a pin 68 and is normally maintained in expanded condition against the stops 69 by the action of a coil spring 70. A fluid pressure motor 71 provided with pistons 72 is mounted in the lower portion of the casing and is adapted to contract the band 65 of the brake D upon the admission of pressure fluid through passageway 73, through the intermediary of piston rods 74, toggle levers 75 and compression rods 76.

A manually controlled pedal 77 (see Fig. 13) pivotally mounted at 78 to the casing 52 and provided with a bellcrank extension 79 is connected to the control rod 80a of valve E through a short link 80. A pivot connection at each end of the short link 80 accommodates swinging movement of the forward end thereof due to movement of the pedal 77.

The brake control valve E is supplied with pressure fluid from a pump F (which will be described in detail later on in this specification) through line 81a. Valve E is provided with an upper chamber 82 and a lower chamber 83 in which the piston members 84 and 85 are respectively slidable. Piston member 85 is resiliently urged toward the rear of the valve chamber 83 by the spring 86, which is of such strength that it may be compressed by the force of pressure fluid flowing into the rear end of chamber 83 through pressure line 87 which is supplied from the gear pump G (see Figs. 2 and 13) driven by the speedometer drive gear 88 mounted on the tail shaft of the transmission.

Pump G is designed to supply fluid to the lower chamber of valve E at a pressure high enough to overcome the force of the spring 86 at a vehicle speed above idling speed. This cuts off line 73 from communication with pressure line 81 and thereby prevents application of the brake D when the vehicle is traveling at high speed. It will readily be appreciated that to abruptly arrest the rotation of runner segment 29 while the vehicle is traveling at high or even intermediate speed would through a severe strain on the runner segment 29 and hollow shaft 46 as well as on the brake D and associated mechanism and damage to the parts would probably result. Inasmuch as the brake D need be used only when shifting the gears in transmission unit B into forward or reverse drive, which operation is performed when the vehicle is at rest or proceeding at a slow rate of speed, this safety feature provided by the pump G and valve E does not interfere with normal operation of the vehicle. A metering pin 87', adjustable from outside of the valve casing regulates the size of the orifice port 83' through which the fluid from pump G flows. Adjustment of the pin 87' permits the fluid pressure in chamber 83 to be varied thereby making it possible to vary the speed at which the brake D will be rendered inoperable.

Fig. 5 shows the position of valve piston members 84 and 85 during the time that the vehicle is running at speed and pedal 77 is released. Pressure fluid from pressure line 81a of pump F enters chamber 82 of valve E at inlet passage 81 and flows out through line 92 (see Fig. 8) which communicates with the circular chamber 46' surrounding sleeve 46 at this point. From here the oil flows forwardly under pressure through the hollow chamber surrounding the hub 50 and thence through the passageways 47' into the interior of casing 25.

The fluid is then thrown outwardly around the runner 49 by centrifugal force and enters the working passages of the fluid coupler at 27 from whence it flows through a plurality of passages bored through the impeller hub, one of said passages being shown at 42', and into the annular space 40' between bearing 19 and hub 40. Hollow shaft 41 is provided with a passage 41' connecting the space 40' with the central bore of the shaft through which the fluid flows into the hollow chamber 111 and thence through the hollow bore of shaft 110. Oil holes are provided at intervals along shafts 41 and 110, as indicated at 19', which permit the fluid to flow outwardly through the various gears, bearings, etc., thus providing pressure lubrication for the entire mechanism. The fluid eventually finds its way into the sump 99 from which it enters the suction side of pump F through passage 100.

In addition to delivering lubricant under pressure to the various moving parts of the transmission system, the fluid circulation system just described has another important function. By continuously changing the fluid in the working passages of the fluid coupling and circulating said fluid throughout the transmission casing, which obviously has a much greater surface area than the casing 25, the heat generated in the coupling due to slippage between the rotating elements thereof is dissipated.

By causing the working fluid of the coupling to be continually changed during the operation thereof, the heating problem due to slippage at periods when torque demand is high is done away with. It will be noted that the circulation of the fluid is cut off during the time that the brake D is applied due to the fact that line 92 is cut off from communication with inlet passage 81 of pressure line 81a. As brake D is applied for short periods only and always at low engine speeds, no adverse effect will result from this lack of pressure, enough fluid being thrown by the rotation of the gears themselves to provide sufficient lubrication.

At the same time (that is, when running at speed) pressure fluid from pump G is entering the lower valve chamber 83 through line 87 and is retaining piston 85 in its extreme forward position against the force of spring 86. Under these conditions, should the pedal 77 be operated to move piston rod 81a and piston 84 toward the rear of chamber, 82, the pressure fluid entering inlet passage 81 would flow through port 89 into passageway 90 and thence to the low pressure side of pump F through the ports 93 and 93' of chamber 83, which discharge through passageway 94' into the sump 99. The brake D would therefore not be disturbed due to the position of piston 85. However, at low vehicle speeds, the pressure from pump G is not sufficient to balance the force of the spring 86 and piston 85 then moves to its extreme rearward position against the rear end of the chamber 83. If the pedal 77 should now be depressed, sliding piston 84 rearwardly to connect passage 81 with port 89 and close off ports 91' and 92, the pressure fluid from pump F pressure line 81a will enter the passageway 90 and will flow therefrom through port 93 and chamber 83 to passage 73 which leads to the expansion chamber of motor 71, as shown in Fig. 4. Pistons 72 will be forced apart and brake band 65 will be held contracted against the drum 67 as long as pedal 77 is held in depressed position thereby stopping rotation of runner segment 29 and permitting the forward and reverse driving gears in casing B to be shifted without clashing.

The pump F is more fully illustrated in Fig. 8 and comprises an inner driving member 93 fixed to the rearwardly extending hub 50 of the flywheel cover 25 by means of spline teeth. This driving member has a plurality of teeth 94, one less in number than the companion internal teeth 95 of the outer driven pump member 96. This general type of pump is well known in the art, the arrangement being such that the inner member 93 rotates with the flywheel and impeller 25, thereby rotating outer pump member 96 and causing fluid to be drawn into the pump suction chamber 97 and delivered under pressure at a pump pressure chamber 98.

The pump F is located adjacent the brake D and is supplied with fluid from the sump 99 of the housing 45. The fluid is drawn through an intake passage 100 to the suction chamber 97 which is open to the crescent-shaped intake chamber 101. The fluid is passed from the chamber 97 into the crescent-shaped delivery port 102 for delivery to the passage 81a which leads to the pressure port 81 of valve E. A spring pressed relief valve 103 is provided in line 81a for relieving the pump of excess pressure through the port 104 which permits the excess pressure fluid to flow into the sump 99.

With the mechanism so far described, power may be delivered from the impeller 23 to the driving gear 105 of the gearing B either directly from the secondary runner segment 30 by way of the hub 40 which is splined on shaft 41 or from the primary runner segment 29 through hub 47, hollow shaft 46, sun gear 54, planetary carrier 56 and overrunning clutch C, or from both the primary and secondary runners.

Gear 105 is formed directly on the rearwardly extending end of the shaft 41 and is in constant meshing engagement with a gear 106 which, together with the integrally formed gears 107 and 108, is mounted rotatively on a countershaft 109 in axially parallel relationship with shaft 41 and tail shaft 110. The latter is piloted in the hollow portion 111 of gear 105 by means of the roller bearing 112 and is supported at the rear end of the transmission casing 45 by the anti-friction thrust bearing 113, through the intermediary of the sleeve 114 which is splined to shaft 110 and which has the speedometer and pump drive gear 88 formed on its rear end and male clutch teeth 115 formed on its forward end. A second sleeve 116 is splined on the extreme rear end of shaft 110 and cooperates with the fluid seal 117 to prevent the escape of fluid from the casing. A brake drum 118 is fastened to sleeve 116 by the fasteners 119 and forms part of a conventional transmission shaft brake.

Formed integrally upon the extreme rearward end portion of shaft 41 adjacent the gear 105 is a clutch member provided with a plurality of ramped teeth 105' which are adapted to mesh with mating internal teeth 121' formed on a slidable coupling sleeve 121 (see Fig. 14). Teeth 121' are in constant meshing engagement with the teeth 122' formed on the forward end of a sleeve 122 which is splined on shaft 110.

Sleeve 122 carries a second sleeve, designated 123, on which is formed the gear 124 normally meshed with the countershaft gear 107. An overrunning clutch L of the reverse type (see Fig. 12) connects the rear end portion of shaft 41 with shaft 110 in such manner that shaft 41 may overrun shaft 110 in clockwise direction whenever coupling sleeve 121 is in disengaged position.

An overrunning clutch of the type similar to that shown in Fig. 11 is interposed between sleeves 122 and 123. This clutch is designated by the letter K in Fig. 1 and permits sleeve 122 to overrun sleeve 123 in a clockwise direction during the time that the vehicle is driving forwardly in direct drive, and it also permits sleeve 123 to overrun sleeve 122 in a counterclockwise direction during reverse driving of the vehicle as will be presently apparent. Clutch K establishes a driving relationship between sleeves 122 and 123 whenever sleeve 123 tends to overrun sleeve 122 as is the case when the underdrive mechanism is operating. The functions of clutches L and K will be more fully brought out later on in this description.

From the mechanism so far described, it will be seen that gears 105 may deliver power to sleeve 122, which has a splined connection to tail shaft 110, through clutch teeth 105', coupling sleeve 121 and clutch teeth 122' of sleeve 122 or, if coupling sleeve 121 is moved to the position indicated by the dotted lines in Fig. 1, the direct driving relationship between shaft 41 and sleeve 122 will be released and power will be delivered from gear 105 to sleeve 122 through gear 105, countershaft gears 106 and 107, gear 124, sleeve 123 and roller clutch K.

A reverse driving setting of the transmission may be obtained by manipulation of the shift lever 61 (see Figs. 1, 2 and 3). Lever 61 is pivotally mounted on the transmission casing by means of a stub shaft 126 on the inner end of which is fixed an arm 127, the lower rounded end of which is engaged in a slot 129 formed in the shift collar 128. The latter is slidably mounted on a shaft 130 which is disposed longitudinally of the casing and fixed thereto at each of its ends. Shaft 130 is provided with a plurality of grooves 131 which are adapted to be engaged by the spring pressed ball of a detent 132.

Formed integrally on collar 128 is a shifter fork 133 which rigidly engages a groove formed in the rearward end of sleeve 123 as is clearly shown in Fig. 2. A second shifter fork 134 is pivoted at 135 to the collar 128 which has a stop 136 (Fig. 3) to limit pivotal movement of fork 134 in the forward direction. A coiled compression spring 137 yieldably urges the fork 134 against the stop 136.

Figs. 1 and 2 show the various parts in forward direct driving position. To secure reverse setting of the mechanism, lever 61 is moved forwardly to the position indicated in dotted lines in Fig. 1 thereby bodily sliding collar 128 rearwardly along shaft 130 until the spring pressed ball of detent 132 engages the rearmost groove 131. As collar 128 is shifted rearwardly, sleeve 123 and coupling sleeve 121 are also shifted because of the stop 136 and the connection between these elements through forks 133 and 134. By referring to Fig. 1, it will be seen that sleeve 122 is shifted along with sleeve 123 due to the connection between these elements afforded by the grooved collar 138 and snap ring 139 respectively. As the assembly is moved rearwardly, the gear 124 is meshed with idler gear 125 and the female clutch teeth 140 are meshed with the male clutch teeth 115 formed on sleeve 114.

Reverse (or counterclockwise) rotation may now be imparted to sleeve 114 and shaft 110 through gear 105, countershaft gears 106 and 108, idler gear 125, gear 124 and clutch teeth 140 and 115; sleeve 123 overrunning sleeve 122 through overrunning clutch K, the overrunning clutch L permitting shaft 110 to rotate in an opposite direction to shaft 41.

The apparatus for controlling the kick-down underdrive mechanism will now be described, reference being made to Figs. 1, 2, 6 and 7.

The underdrive is brought into operation at the will of the driver by an electrically operated device comprising a solenoid indicated generally by 141, which is mounted on the right side of the transmission casing adjacent the rear end thereof. The solenoid is contained within a casing 142 having a lateral flange secured to a plate 143 by screws 144. Plate 143 is in turn secured to the rear wall 145 (Fig. 2) by the transmission casing by suitable fastening means. Contained within the casing 142 is the usual solenoid coil 146 spaced from the plate 143 by the spacer 147 having a central opening accommodating the solenoid core 148. The latter has an opening 149 therein through which extends the coupling sleeve actuator rod 150 and within which is disposed a coil spring 151 surrounding the rod 150. One end of the spring 151 abuts a washer 152 fixedly mounted on rod 150, the washer abutting the adjacent face of the radially inwardly extending portion of the end wall of core 148 which portion has an opening 152'. The opposite end of spring 151 seats against an abutment 153 secured to the core 148. The relation of spring 137 (Fig. 2) to spring 151 is such that when the latter is compressed by movement of core 148 to the right, as indicated in Fig. 6, the built-up energy is sufficient to move rod 150 and fork 134 to the right against the resistance of spring 137 for retracting the coupling sleeve 121 to the dotted line position shown in Fig. 1, as will be presently apparent.

Carried by and movable with the solenoid core 148 is a metallic rod 154 having a portion thereof projecting axially beyond the adjacent end face of the core and extending into an opening 155 in the end face of casing 142. The rod 154 is adapted upon movement of core 148 in response to energization of the solenoid to engage a contact point on an oscillatable switch blade 156 included in the engine ignition system as hereinafter set forth. The switch blade 156 is carried by an insulating mounting 157 secured by a screw 158 to casing 142. An insulating leg 159 is carried by blade 156 and engages the end face of the casing 142, it being understood that the blade is yieldably urged to the position shown in Fig. 6 by suitable means such as a relatively light spring.

The end face of the casing has an opening 160 accomodating the free end of rod 150, the latter being provided with an electrically insulated extremity 161 engageable with the switch blade 156 for the purpose hereinafter set forth, it being understood that the rod 154 is adapted upon energization of the solenoid to engage the switch blade contact point prior to engagement of the insulated extremity, 161, of actuator rod 150 with the switch blade. As will be presently apparent, the rod is moved to engage the contact point of switch blade 156 for momentarily interrupting the engine ignition circuit, while subsequent engagement of the insulated extremity 161 of rod 150 with the blade reestablishes the circuit.

The switch 156 is included in the internal combustion engine ignition system or circuit which may be of any desired type and as herein illustrated includes the usual storage battery 162 having a connector 163 to the primary 164 of the ignition coil and a return connector 165 in the latter of which is interposed a suitable switch, indicated at 166. The circuit also includes the secondary coil 167 connected with the movable member 168 of the distributor, generally indicated at 169, the latter having a series of stationary contacts connected by circuit wires to the respective spark plugs of the vehicle engine. One such connection is indicated at 170 for the insulated member of the spark plug 171, the opposing member of the spark plug being grounded to the engine as is also the coil 167, as indicated at 172. Connector 173 leads from the connector 163 to switch 156. The solenoid coil 146 is connected to the aforesaid circuit by wire 174, the circuit to the solenoid being controlled by the switch indicated at 175. Between the wire 174 and the switch 175 (the operation of which will be made clear later) a second switch P is provided. Switch P is suitably fastened to the casing of solenoid 141 (Figs. 2 and 6) and has an insulating portion 205 carrying a pair of terminals 174' and 204'. Terminal 204' is connected through wire 204 to one side of the switch 175 and terminal 174' is connected to the solenoid coil 146 through wire 174. The casing of switch P is cylindrical and encloses a piston-like contact element 206 urged to switch open position (as shown in Fig. 6) by a spring 207. Fluid from tail shaft pump G flowing in pressure line 87 and thence to branch line 87a (Figs. 7 and 13) is introduced into switch P beneath the piston-like element 206. It is clear that the element 206 of switch P will be in switch open position so long as the pressure of the fluid in line 87a is not high enough to overcome the resistance of the spring 207, which is designed to maintain switch P in said open position until the vehicle has attained a speed sufficient to prevent the engine from stalling should the ignition be cut off for an instant by the solenoid cut-off switch just described. As soon as the vehicle has attained a speed of approximately 15 miles per hour, the pressure in line 87a will rise due to the increase in speed of tail shaft pump G and piston element 206 of switch P will be urged upwardly (as shown in Fig. 6) into contact with the contact elements formed integrally with terminals 174' and 204' respectively. Operation of the kick-down switch 175 will now effect rearward movement of coupling sleeve control rod 150 to bring about a change in the driving ratio as has already been described and which will be made more clear as the description proceeds.

As previously mentioned, switch P is provided as a safety measure to prevent the kick-down mechanism from being operated at low vehicle speeds when interruption of the ignition circuit might cause the motor to stall. It is however desired to point out that switch P may be omitted if desired without materially affecting the operation of the device. In ordinary operation of a vehicle embodying the present transmission, the motor may attain the speed of 1000 r.p.m. or more before lock-up occurs between the driving and driven elements of the fluid coupling forming part of torque multiplying unit A, due to the slip permitted between these elements under high torque demand conditions, such as those encountered during starting of the vehicle and in rapidly accelerating in direct drive. Under such conditions, the engine M will necessarily be operating at a relatively high speed before actuation of kick-down switch 175 can occur because it is necessary that the engine throttle be opened to its wide open position before switch 175 can be closed as will be presently described. In view of the fact that the engine ignition is interrupted for a fraction of a second only to secure the reversal of torque necessary to relieve the frictional load on the teeth 105' and the teeth of coupling sleeve 121, it is apparent that stalling of the engine would be a remote possibility. Should the fluid coupling in unit A be supplanted by a conventional friction clutch, it is probable that switch P would be necessary due to the fact that the engine would be prevented from attaining a high speed when starting the car, or when accelerating at low speeds because of the almost total absence of slip in the friction clutch.

The make and break switch, indicated at 168', operates in timed relation with the movable member 168. That is to say, the contact is broken as the member engages a respective contact point and contact is made as the member 168 breaks contact with the aforesaid point.

The switch indicated at 175 is controlled by manipulation of a suitable vehicle driver operable member illustrated herein (in the modification now being described) as the accelerator pedal for the engine throttle control mechanism. Referring to Fig. 13, the engine M is provided with the usual intake manifold 176 to which is conducted the usual gasoline and air mixture from a carburetor 177 under control of a butterfly valve 178, adjustable by a lever 179, so that when the throttle valve is in its wide open position, the lever 179 will engage a stop 180 to prevent further throttle opening movement of lever 179. An operating rod 181 has one end thereof pivotally connected as at 182 to the lever 179, the other end of the rod being operatively connected to a lever 183 pivotally supported on the vehicle at 184 for swinging movement.

The swinging movement of lever 183 is controlled preferably by the foot operated accelerator pedal 185 pivotally supported at 186 on the vehicle driver compartment toe board 187, a spring 188 yieldingly urging pedal 185 upwardly to throttle closing position. A short arm 189 operatively connects pedal 185 with the lever 183.

Throttle valve actuating rod 181 is pivoted to throttle control lever 179 through a "lost motion" mechanism 190 more clearly illustrated in Fig. 10. The rod 181 is adapted to slide through an opening in the ear 191 of bracket 192, this bracket having a forward portion 193 secured to a guide block 194 provided with a rearwardly open bore 195 and having pivotal connection at 182 with throttle control lever 179. Rod 181 has fixed thereto a collar 196 forwardly adjacent the ear 191, a preloaded spring 197 surrounding the rod and acting between the block 194 and the collar 196 so that normally this spring serves as a connection between rod 181 and block 194. The spring 197 functions as an overtravel spring and permits rod 181, lever 183 and pedal 185 to have a certain amount of overtravel after lever 179 has engaged the stop 180. During the overtravel of accelerator pedal 185, spring 197 advises the driver that he is manipulating the accelerator pedal for actuation of the kick-down mechanism by reason of the extra resistance in addition to spring 188 afforded by this compression of spring 197 when the collar 196 moves toward the block 194. In other words, when the accelerator pedal is manipulated for kick-down, an extra resistance is encountered by reason of compressing spring 197 during operation of the Fig. 10 mechanism which accommodates overtravel of the accelerator pedal beyond its wide open throttle position. The forward end of rod 181 is slidably disposed in the bore 195, the bracket 192 limiting the separating tendency of rod 181 and block 194 under the action of spring 197.

When the accelerator pedal 185 is depressed to open the throttle valve 178, link 189 operates to swing lever 183 forwardly about the pivot 184, rod 181 thrusting block 194 forwardly without relative movement therebetween so as to swing lever 179 forwardly and, if the accelerator pedal is depressed to its end of range of opening throttle movement, the lever 179 will engage stop 180. The accelerator pedal 185 is adapted to have a further range of movement for overtraveling the throttle valve, while maintaining the latter in its wide open throttle position, and in order to accommodate this overtraveling movement the mechanism illustrated in Fig. 10 comes into action so that during forward overtravel of rod 181, said rod will slide into the bore 195 and compress spring 197 without forwardly moving block 194 or the throttle operating lever 179. Upon release of the accelerator pedal 185, spring 188 assisted by spring 197 operates to restore the parts to the throttle closed positions illustrated in Fig. 13. During this return movement of the parts, rod 181 and the parts between this rod and the shaft 186 move relative to block 194 and lever 179 until the collar 196 engages the ear 191 of the bracket 192 and thereafter spring 188 will move rod 181 along with the block 194 and lever 179 without lost motion until the throttle valve 178 is restored to the closed position and the accelerator pedal 185 is correspondingly positioned as in Fig. 13.

The aforesaid overtraveling movement of the accelerator pedal 185 is adapted to effect energization of the solenoid 141 through operation of the switch 175. A switch operating lever 199 is fixed to the aforesaid lever 183 and is adapted to move therewith, this lever 199 having a pair of switch operating fingers 200 and 201 alternately engageable with the swinging operating element 202 of the switch 175 which is preferably of the well-known snap-over type and is provided with contacts 198 and 203. Contact 198 is connected to wire 204 which leads to one side of the pressure operated switch P (Figs. 6 and 7) and contact 203 is connected to one side of the battery 162 through wire 205.

In the fully released (throttle closed) position of the accelerator pedal 185, as in Fig. 13, the finger 200 has operated the switch element 202 so that the switch is open and when the accelerator pedal 185 is depressed to the limit of its aforesaid throttle opening range of movement, the finger 201 has been swung upwardly about the lever support 184 and into engagement with the forward face of switch element 202. When the accelerator pedal is depressed for the aforesaid overtraveling range of movement, the finger 201 then swings the switch operating element 202 in a counterclockwise direction to cause this element to have the usual snap action in closing the switch. When the accelerator pedal is released from wide open throttle position, finger 200 does not immediately engage switch element 202 for restoring the switch to its open position, this finger 200 engaging the switch element by preference when the pedal nears the end of its fully released position such that the last portion of the releasing movement of the pedal is utilized for causing finger 200 to effect the snap-over switch opening movement of the element 202 in restoring the parts to their Fig. 13 position.

Returning for a moment to Figs. 2 and 3, it will be noted that a Bowden wire 230 enclosed in the usual sheath 235 is attached to the rear bottom portion of the solenoid casing. This Bowden wire extends upwardly to an operative connection with a manually operated control element 237 mounted on the vehicle instrument panel 238. A suitable detent mechanism 239 (Fig. 13) is provided for releasably holding the element 237 in one or the other of two operative positions. At its lower end, wire 230 is operatively connected to a second coupling sleeve control rod 150' (Fig. 3). Control rod 150' is identical in its operation with rod 150 but differs as to the control features thereof. Rod 150' extends through a hole in the shifter fork 133 and through an enlarged hole in the member 134 in a manner identical with rod 150. When the control element 237 is in the position shown in Fig. 13, rod 150' is in its corresponding forward position identical to that of rod 150 in Fig. 2, and coupling sleeve 121 is in its driving position. When it is desired to drive the vehicle through the underdrive mechanism under such conditions that it would be undesirable or inexpedient to bring the underdrive into operation by means of the solenoid control, the control element 237 is pulled rearwardly to its outward position, in which it is releasably held by the detent 239, thereby exerting a pull on the Bowden wire 230 and effecting a rearward movement of control rod 150' which disengages coupling sleeve 121 from driving engagement with gear 105. Movement of control element 237 forwardly to its inner position will move rod 150' forwardly, thereby permitting spring 137 to urge fork 134 forwardly for effecting an engagement of coupling sleeve 121 with gear 105 at the instant the two elements become synchronized as will presently be explained. It can thus be seen that a manual control is provided for actuation of the coupling sleeve 121 that is entirely independent in its operation from the kick-down mechanism. The manual control element 237 may be operated to lock the parts in underdrive position for sustained periods to meet various conditions of operation such as those encountered when the vehicle is ascending a long hill or for sustained driving in heavy traffic at low speeds.

In the operation of the power transmission as a whole, we will assume that the selector element 61 is positioned in neutral and that the engine is not operating, this being the condition of the parts when the car is parked. The sleeve 123 will be positioned intermediate its forward and reverse positions and the ball of detent 132 will be engaged in the centrally located groove 131 as shown in Fig. 2. We will further assume that the control member 237 is in its Fig. 13 position so that the coupling sleeve control rod 150' is in its forward position as shown in Fig. 2. Control rod 150 will of course also be in its normal forward position.

When it is desired to drive the vehicle forwardly, the engine is started in the usual manner, the transmission still being in neutral, thereby causing rotation of crankshaft 20, flywheel 22, and impeller 23 of the torque conversion unit A. At idling speed of the motor, the circulation of fluid in the fluid coupling is correspondingly slow, but enough power will be transmitted to the runners 29 and 30 to cause slow rotation of shaft 41 and gear 105, thereby making it impossible to mesh the gears in gearset B because of the difference in speed between them. When the engine is cold, the shaft 41 will rotate at a faster rate due to the "fast idle" mechanism which is commonly provided and which is effective until the engine warms up.

Therefore, before selector lever 61 is moved to engage coupling sleeve 121 with teeth 105' and to engage gear 124 with countershaft gear 107, it is necessary to arrest the rotation of gear 105. The driver will therefore depress pedal 77 (which acts as an ordinary clutch pedal) to cause fluid to flow from pump F through valve E to cylinder 71 of brake D. Pump F is driven by the hub 50 of impeller 23 and operates at all times when the motor is operating. Because tail shaft 110 is idle at this stage, the pressure in line 87 connecting tail shaft pump G with valve E is zero and piston 85 of the latter is in its rearward position thereby allowing fluid from pump F to flow through line 81 into chamber 82 of valve E, thence through port 89 into passage 90, through port 93 into chamber 83 and thence through passage 73 into the expansion chamber of brake cylinder 71. Brake band 66 is thus applied to drum 65 to arrest rotation of hollow shaft 46, thereby also arresting rotation of primary runner 29. Holding primary runner 29 against rotation effectively prevents energy from being transmitted to secondary runner 30, thus gear 105 and countershaft gears 106, 107 and 108 will be held stationary.

Movement of selector lever 61 to engage sleeve 123 for forward drive may now be accomplished smoothly and silently. Referring to Figs. 1 and 2, forward movement of the lower end of selector lever 61 will move collar 128 forwardly until the detent ball engages the forward slot in shaft 130 and carry with its sleeve 123 and coupling sleeve 121, thereby engaging the teeth of the latter with clutch teeth 105' and meshing gear 124 with countershaft gear 107.

The driver may then release pedal 77 which will cut off the flow of fluid to brake cylinder 71 and vent said cylinder to the low pressure side of pump F through line 73, chamber 83, port 93, passage 90, port 91, port 91' and passage 94'. The vehicle is now ready to be accelerated through the torque conversion unit A composed of the fluid coupling and the planetary gearset 54, 55, 56.

Pedal 77 need not be held in depressed position until the car starts but only while lever 61 is being manipulated. Under ordinary conditions the energy transfer through the fluid coupling will not be sufficient to start the car when the motor is idling due to the slip between the impeller and runner elements. Any tendency of the vehicle to creep may be arrested by application of the regular vehicle brakes or by depression of pedal 77.

Upon opening the engine throttle, the vehicle is accelerated forwardly through the planetary gearing. Shafts 41 and 110 tend to remain stationary, along with runner 30, so that the initial drive to shaft 41 is from runner 29, hub 47, hollow shaft 46, sun gear 54, planetary carrier 57 and overrunning clutch C, the rollers thereof being wedged into driving relationship with the cam element 60. As cam element 60 is splined on shaft 41, the driving effort is transmitted to said shaft and thence to shaft 110 through clutch teeth 105', coupling sleeve 121 and clutch teeth 122' of sleeve 122. Overrunning clutch K permits sleeve 122 to overrun sleeve 123 and overrunning clutch L is locked out of operation by the coupling sleeve 121. Sleeve 123 is driven through gear 105, 106, 107, 124 but has no driving effect because of overrunning clutch K.

As soon as runner 29 starts its rotation in driving the vehicle, runner 30 receives a driving force occasioned by the rotative energy of the fluid circulated from runner 29 to runner 30. As runner 29 progressively increases in speed, during acceleration of the vehicle, runner 30 thereby receives a corresponding increase in driving torque from runner 29 and, since there is only 100% of the motor torque available (neglecting fluid friction and other unavoidable minor losses), the torque multiplication through the planetary gearing to shaft 41 progressively diminishes in proportion to the increase in energy received by runner 30 from runner 29 and applied without multiplication directly to shaft 41 through hub 40.

Runner 29 continues to drive shaft 41 through the planetary gearing until such time as the torque resistance on shaft 41 is overcome by power imparted to runner 30 by runner 29. The speed of runner 30 then approaches that of the runner 29 which in turn approaches the speed of impeller 23. As soon as runner 30 takes all of the load, viz., as soon as cam element 60 and shaft 41 rotate faster than carrier 57, then runner 29 tends immediately to rotate at approximately the same speed as that of impeller 23 and runner 29 ceases to impart a drive but coasts and acts as a fluid passage conducting medium for delivering fluid from impeller 23 to runner 30 much as though impeller 23 and runner 29 were a unit. The driving speed ratio under such conditions is 1:1 or direct between crankshaft 20 and shaft 41, it being understood that this will ordinarily vary slightly due to inherent slippage in the fluid coupling.

During the aforesaid approach to the "cut-in" between shafts 20 and 41, it will be apparent that the torque applied to shaft 41 from runner 29 is a maximum at the start of vehicle acceleration and decreases through an infinite series to zero at direct cut-in. Likewise the torque applied to shaft 41 from runner 30 is zero at the start of acceleration and increases through an infinite series to a maximum at the direct cut-in. Thus all of the available torque of impeller 23 is utilized during vehicle acceleration but with progressively decreasing torque multiplication. This is, of course, a desirable condition in rapidly and smoothly accelerating the vehicle.

The speed at which the direct cut-in normally takes place may be varied by altering the proportions or capacities of the fluid coupling elements as well as by varying the value of the reduction gear train. For example, reducing the capacity of runner 30 will act to increase the cutting-in speed which ordinarily is preferably arranged to take place when the vehicle is normally accelerated to a speed of 18 to 25 m.p.h. although this may be varied as conditions require. It is of course assumed that ordinary commercial conditions of reduction gearing at the differential wheel drive (not shown) exist although by proportioning the coupling parts and gear train value the mechanism may be readily caused to perform with widely varying characteristics.

The power transmission provides for use of the engine as a brake while coasting, since under such conditions shaft 110 will be coupled to shaft 41 by coupling sleeve 121 (or by clutch L should sleeve 121 be disengaged) and runner 30 drives impeller 23 through runner 29 which is allowed to coast by reason of the overrunning clutch C.

The operation of the mechanism to obtain reverse driving of the vehicle will now be described. Assuming that the vehicle motor is operating and the gearing in casing B is in its neutral position with the ball of detent 132 engaged in the central groove 131 of shaft 130, the operator may obtain a reverse setting of the transmission by depressing the pedal 77, thereby arresting rotation of runner 29. Selector lever 61 is then moved forwardly about its pivot 126 thereby shifting collar 128 rearwardly until the ball of detent 132 engages in the rear-most slot 131 of shaft 130. This movement of the collar 128 carries sleeves 122 and 123, together with the coupling sleeve 121, rearwardly as a unit thereby meshing with reverse idler 125 and engaging female clutch teeth 140 with male clutch teeth 115. The vehicle may then be driven rearwardly through the torque conversion unit A, the driving effort being transmitted from shaft 41 to shaft 110 by means of gears 105, 106, countershaft gear 108, reverse idler 125, sleeve gear 124 and clutch elements 140 and 115. During the reverse driving of the vehicle, shaft 110 will rotate in a direction opposite to that of shaft 41, this reverse rotation being permitted by the overrunning clutch L.

It is of course possible when starting to accelerate the vehicle through the underdrive gearing B, as well as through the torque conversion unit A, by depressing the accelerator pedal 185 to the limit of its overtravel permitted by the spring 197, thereby closing switch 175 and energizing solenoid 141 to move the coupling sleeve 121 to its rearward position where it is disengaged from gear 105. Such action is sometimes desirable when starting under a heavy load or when fast pick-up is desired. In cases where a pressure control switch, such as that designated P in Figs. 6 and 7, is incorporated in the kick-down control mechanism, the kick-down unit B will not operate to provide an underdrive through the countershaft gearing until the speed of tail shaft 110 has risen sufficiently to cause pump G to supply fluid pressure at a value high enough to close the circuit through switch P against the action of spring 207.

The vehicle may of course be started in underdrive at any time by pulling the manually operable control element 237 to its outward position, thereby causing coupling sleeve 121 to be moved to its rearward non-driving position through the intermediary of Bowden wire 230 and coupling sleeve control rod 150'. Should the vehicle be started with manually operable control element 237 in its outward position, direct drive through gearset B may be obtained at any time by pushing control element 237 forwardly and momentarily releasing the accelerator pedal to secure a reversal of driving effort through the transmission. Movement of control element 237 to its forward position will of course move coupling sleeve control rod 150' forward, thereby releasing fork 134 and permitting said fork to swing forwardly about its pivot 135 under the influence of coil spring 137. At this instant, however, shaft 41 is turning at a speed considerably greater than shaft 110 and sleeve 122, thus the teeth of coupling sleeve 121 cannot mesh with clutch teeth 105' until shafts 41 and 110 are synchronized. Momentary release of the accelerator pedal will cause a reversal of drive through the transmission and the speed of shaft 41 will decrease. The speed of rotation of shaft 41, however, cannot fall below that of shaft 110 because such action will be opposed by the overrunning clutch L, the rollers of which will wedge into driving engagement whenever shaft 110 tends to overrun shaft 41. At such instant of synchronization of shafts 110 and 41, ramped teeth 121' of coupling sleeve 121 will slide into engagement with the ramped clutch teeth 105' under the influence of spring 137. Depression of the accelerator pedal will then cause the shaft 41 to drive directly the shaft 110 through the coupling sleeve 121. Under these conditions, should roller clutch L lock into driving engagement in such position with relation to clutch teeth 105' and 121' that "dead ending" of the teeth occurs, coupling sleeve 121 will not drivingly engage shaft 41 until the driver depresses the accelerator pedal slightly. Such action on the part of the driver will cause slight rotation of shaft 41 with respect to shaft 110 and will permit teeth 121' to slide into mesh with teeth 105'.

It will be noted that roller clutch L prevents free wheeling of the vehicle at all times even when the shift lever 61 is in neutral position.

Whenever the car is being driven on the road, the kick-down underdrive operable by overtravel of accelerator pedal 185 is always available (assuming that the control element or coupling sleeve 121 is in its forward position illustrated in Figure 1) so that the mechanism B may be manipulated to secure an underdrive for passing another vehicle on the road or under other conditions. The kick-down control is particularly advantageous when the car is driven in the city because it affords a very desirable flexibility of control making it possible to secure rapid acceleration for maneuvering in traffic. The kick-down mechanism is brought into action by depressing accelerator pedal 185 beyond its wide open throttle position, thereby closing switch 175 and energizing solenoid 141 to move coupling sleeve control element 150 toward the rear, which operation takes place at the instant of reversal of drive through the transmission caused by the momentary opening of the ignition circuit by switch blade 156.

As explained above, momentary interruption of the ignition circuit is necessary to unload the teeth 105' and 122' so that coupling sleeve 121 can be moved rearwardly. The operation just described takes place in an instant and is barely noticeable to the occupants of the vehicle. As soon as the ignition circuit is restored (by the action of the rear end of the control rod 150) the motor drives under wide open throttle conditions through torque conversion unit A (which under these conditions would ordinarily be driving shaft 41 directly at approximately the speed of the motor) to gear 105 and thence to the tail shaft driving sleeve 116 through countershaft cluster gears 106 and 107, gear 124, sleeve 122 and shaft 110. During this period, sleeves 122 and 123 are drivingly coupled together through clutch K and shaft 41 overruns shaft 10 through overrunning clutch L. The vehicle will continue to be driven in underdrive as long as the driver maintains the accelerator pedal 185 depressed. It is not necessary for the driver to hold the accelerator pedal depressed to the full extent of its overtravel because solenoid 141 will remain energized until the pedal 185 has returned to its idle position under the influence of spring 188. This can be readily understood by referring to Fig. 13 wherein it will be seen that the switch control element 199 is so constructed and arranged that release of the accelerator pedal 185 to its idle position is necessary before finger 200 of element 199 will contact element 202 of snap switch 175 which controls the solenoid 141. The vehicle may then be driven in underdrive at any speed desired by the driver and direct drive conditions through unit B may be restored at the will of the driver by simply releasing accelerator pedal 185. As soon as pedal 185 has been returned to its throttle closed position by spring 188, switch 175 will be opened by the action of element 199 and solenoid 141 will be de-energized, thereby permitting the core 148 and coupling sleeve control rod 150 to be returned to their forward positions by the fork 134 which is now free to swing about its pivot 125 on the collar 128 under the influence of the coil spring 137 to return coupling sleeve 121 into meshing engagement with teeth 105'. This action cannot immediately take place, however, due to the fact that shaft 41 is overrunning shaft 10 and sleeve 122, thus coupling sleeve 121 will be prevented from moving forwardly under the influence of the spring 137 by the action of the ramp teeth on the members 105 and 121. The teeth 121' of coupling sleeve 121 will continue to rotate by ratcheting past the teeth 105' without meshing therewith until sleeve 122 reaches the same speed of shaft 41 and gear 105. This synchronization of shafts 110 and 41 will take place very shortly after the accelerator pedal 185 has been released because as the throttle is closed shaft 41 will decrease in speed but shaft 41 cannot run slower than shaft 110 because the rollers in clutch L will wedge into driving engagement and shaft 110 will tend to drive shaft 41 through the overrunning clutch L. It can thus be seen that shafts 41 and 110 must become synchronized as the speed of the motor is allowed to fall off by reason of the release of the accelerator pedal. At the instant of synchronization between shafts 41 and 110, spring 137 will urge fork 134 forwardly and the teeth of coupling sleeve 121 will engage with the teeth 105' thereby effecting driving engagement between gear 105 and sleeve 122 (unless teeth 105' and 121' "dead end" as previously explained). Depression of the accelerator pedal 185 will now cause the vehicle to continue driving in direct drive.

Fig. 19 illustrates a modification of the arrangement just described. Similar parts in Fig. 19 have been given the same reference numerals as those in Fig. 13 which correspond thereto. The modification illustrated in Fig. 19 differs from that just described in that the solenoid control snap switch is controlled by a separate button instead of through the accelerator overtravel mechanism. In Fig. 19 the solenoid control switch 175' is identical with switch 175 of Figs. 6 and 7 but is fastened to the toe board of the driver's compartment of the vehicle and is controlled by a button 211. The accelerator pedal is directly connected to the throttle control lever 179 through a link 181'. With the arrangement shown in Fig. 19, the underdrive mechanism may be brought into operation at any time by merely depressing the button 211 which is arranged so that it may be controlled by either the left or right foot of the driver. The vehicle will drive through the underdrive mechanism so long as the button 211 is held depressed. Restoration of direct drive may be effected in a manner similar to that described above by release of the button 211 and a momentary release of the accelerator pedal to secure the reversal of drive through the unit B necessary to synchronize shafts 41 and 110. If desired, the arrangement illustrated in Fig. 19 may be further modified to eliminate interruption of the ignition when switch 175' is closed. It will then of course be necessary for the driver to momentarily release the accelerator pedal 185 after button 211 has been depressed in order to secure a reversal of torque through the unit B which is necessary to unload teeth 105' and 122' so that coupling sleeve 121 can be slid rearwardly by the solenoid.

Figs. 15 to 18 inclusive illustrate a further modification of the invention which differs from those previously described in that the reversal of torque necessary to unload the teeth 105' and 122' is obtained by momentarily partially closing the throttle through overtravel mechanism associated with the accelerator pedal.

In Figs. 15 to 18 inclusive, elements which are similar to those previously described have been given similar reference numerals. As can be seen from Fig. 15, accelerator pedal 185 is operatively connected through a link 189 with lever 183 pivotally mounted to the vehicle at 184. Switch control element 199 is fixed to the lever 183 in a manner similar to that described in connection with Fig. 13 so that depression of the accelerator pedal to the full extent of its overtravel will throw switch element 202 in a counterclockwise direction to close solenoid control switch 175. Likewise release of the accelerator pedal to throttle open position will cause finger 200 of element 199 to throw switch control element 202 in a clockwise direction to open switch 175. In the arrangement shown in Fig. 15, throttle valve 178 is connected to lever 183 through linkage 212, 220 and 223 and throttle control lever 179. A rod 212 pivoted to lever 183 at 213 is mounted for sliding movement through the guide bracket 215 and is provided with an enlarged end portion 214. Rod 212 is also provided with fixed collars 216 and 217 between which is disposed a slidable collar 218 urged by a spring 219 inot engagement with fixed collar 216. A lever 220 is pivoted to the motor block at 222 and has a rounded upper end which is engaged in a slot formed on the downwardly projecting portion of the slidable collar 218. A throttle control rod 223 is pivoted at its rearward end at 221 to the lever 220 and is connected at its forward end to the throttle control lever 179 through an overtravel mechanism 190 which is identical to that shown in Fig. 10. Throttle control lever 179 has an upwardly extending pivotal finger 224 (see Fig. 18) which is retained in alignment with lever 179 by a spring 225. Finger 224 has a downwardly projecting portion 226 which bears against one side of throttle control lever 179 as shown by the drawing. Figs. 16 and 17 are generally similar to Figs. 6 and 7 and illustrate the simplification of the apparatus that is made possible by the elimination of the ignition interrupting mechanism inasmuch as the solenoid, designated 141' in Figs. 16 and 17, need only actuate coupling sleeve control rod 150 and the complicated mechanism shown in Fig. 6 for interrupting the ignition and for preventing said interruption until the vehicle speed has reached a predetermined value may be eliminated.

The operation of the modification illustrated in Figs. 15 to 18 inclusive is exactly the same as that described in connection with Fig. 13 so far as the driver of the vehicle is concerned. Assuming that the vehicle is being driven on the road at speed in direct drive and that the driver wishes to bring the underdrive mechanism B into operation to secure faster acceleration, depression of the accelerator pedal 185 to the full extent of its normal travel will cause throttle valve 178 to be opened to its wide open position and throttle control lever 179 to come to rest against the stop 180. During this movement of the linkage, neither spring 219 nor spring 197 will be compressed. However, further depression of the accelerator pedal will compress spring 219, which in this case is weaker than spring 199, and permit switch control element 197 to close switch 175 thereby energizing solenoid 141' while at the same time the enlarged end portion 214 of rod 212 will come into contact with the upwardly extending finger 224 of lever 179 and will force lever 179 backwardly against the spring 197 which is now compressed. As the rod 212 continues its forward travel, the enlarged end portion 214 thereof will pass over finger 224 and throttle control lever 179 will be snapped back to full open position against the stop 180 by spring 197. The momentary partial closure of the throttle is, however, sufficient to secure the reversal of drive through the transmission necessary to unload the teeth 105' and 122' to permit coupling sleeve 121 to be moved rearwardly by control rod 150. It will be appreciated that the mechanism for closing switch 175 may be adjusted to close the switch before overtravel movement of the accelerator pedal has begun if desired. The underdrive mechanism will, however, not come into operation until the accelerator pedal has partaken of enough overtravel to secure the partial closing of the throttle necessary to reverse the drive through the transmission.

Direct drive conditions may be reestablished at any time by release of the accelerator pedal 185, which will be returned to throttle closed position by the spring 188, the upwardly extending finger 224 of lever 179 moving rearwardly against the spring 225 to allow passage thereover of the enlarged end 214 of rod 212. As soon as the accelerator pedal has reached its throttle closed position, finger 201 of element 199 will throw switch element 202 in a counterclockwise direction, thereby deenergizing solenoid 141' and releasing shifter fork 134. Direct drive will be established through the transmission at the instant of synchronization of shafts 110 and 41 as explained above in connection with Figs. 1 to 14 inclusive.

Having thus described my invention, that which I claim as new and desire to secure by Letters Patent is set forth in the following claims.

I claim:

1. In a motor vehicle power transmission, a drive shaft having a gear and a clutch member carried thereby, a driven shaft disposed in axial alignment with said drive shaft, a sleeve drivingly carried by said driven shaft, a clutch member carried by said sleeve, a second sleeve carried by said first sleeve, means drivingly connecting said sleeves comprising an overrunning device which permits said first sleeve to overrun said second sleeve, a gear carried by said second sleeve, a countershaft, a pair of gears carried by said countershaft, one of said gears meshing with said drive shaft gear, the other of said gears meshing with said sleeve gear, whereby said driven shaft is adapted to be driven at a speed different from that of said drive shaft, means continually urging said clutch members into engagement whereby said driven shaft is adapted to be driven at the speed of said drive shaft, and power operated means for disengaging said clutch members.

2. In a power transmission mechanism for a motor vehicle having an internal combustion engine and an electrical ignition circuit therefor, a drive shaft, a driven shaft, releasable means directly coupling said shafts together, means for driving said driven shaft from said drive shaft at a speed different from that of said drive shaft, said last means being normally inoperable but automatically operable upon release of said coupling means, means for releasing said coupling means and for momentarily interrupting said ignition circuit, and means operable in response to the speed of one of said shafts within a predetermined speed range thereof when said shafts are directly coupled for rendering said coupling releasing and ignition interruption means inoperable to effect ignition interruption and release of said coupling.

3. In a motor vehicle, in combination, a power transmission, a drive shaft adapted to receive drive from the vehicle motor, a driven shaft adapted to drive said vehicle, means for releasably clutching said shafts together, means for driving said driven shaft from said drive shaft at a different speed with respect thereto, said last means being operable in response to release of said clutching means, control means for releasing said clutching means, means for effecting a relief in driving torque through said transmission when releasing said clutching means, and means responsive to the speed of one of said shafts at or below a predetermined speed thereof when said shafts are clutched together by said clutching means for rendering said clutch releasing means inoperable to effect release of said clutching means.

4. In a drive for a motor vehicle having an engine provided with a throttle valve actuator operable by the driver throughout a range of movement in adjusting the throttle valve between its fully opened and closed positions, means accommodating driver operation of said throttle valve actuator throughout its range of movement and therebeyond in a second range of movement overtraveling the throttle valve, a drive shaft adapted to receive drive from the engine, a driven shaft adapted to drive the vehicle, means for driving the driven shaft from the driving shaft releasable to accommodate a relatively faster drive of the driven shaft directly from the driving shaft, clutch means comprising relatively engageable toothed clutch members one of which is adapted for movement to engage the other upon synchronous rotation thereof, means adapted to hold said clutch members in synchronism incident to bringing said members to synchronous condition from an asynchronous condition thereof for facilitating engagement of said members, upon synchronous rotation thereof, means adapted to hold said clutch members in synchronism after bringing said members to synchronous condition from an asynchronous condition thereof for facilitating engagement of said members, to provide said relatively faster drive, and drive control means operable in response to operation of said throttle valve actuator in said second range of movement to effect disengagement of said clutch members.

5. In the drive for a motor vehicle having an engine provided with a throttle valve actuator operable by the driver throughout a range of movement in adjusting the throttle valve between its fully opened and closed positions, means accommodating driver operation of said throttle valve actuator throughout its range of movement and therebeyond in a second range of movement overtraveling the throttle valve, a drive shaft adapted to receive drive from the engine, a driven shaft adapted to drive the vehicle, means for driving the driven shaft from the driving shaft releasable to accommodate a relatively faster drive of the driven shaft directly from driving shaft, clutch means comprising relatively engageable toothed clutch members one of which is adapted for movement to engage the other upon synchronous rotation thereof, means adapted to hold said clutch members in synchronism after bringing said members to synchronous condition from an asynchronous condition thereof for facilitating engagement of said members to provide said relatively faster drive, and drive control means operable in response to operation of said throttle valve actuator in said second range of movement to effect disengagement of said clutch members and accommodate motor vehicle drive through the first said driving means.

6. In a drive for a motor vehicle having an engine provided with a throttle valve actuator operable by the driver throughout a range of movement in adjusting the throttle valve between its fully opened and closed positions, means accommodating driver operation of said throttle valve actuator throughout its range of movement and therebeyond in a second range of movement overtraveling the trottle valve, a drive shaft adapted to receive drive from the engine, a driven shaft adapted to drive the vehicle, means for driving the driven shaft from the driving shaft at a reduced speed with respect thereto, said means being releasable to accommodate direct drive between said shafts, clutch means comprising relatively engageable toothed clutch members one of which is adapted for movement to engage the other upon said synchronous rotation thereof, means adapted to hold said clutch members in synchronism after bringing said members to synchronous condition from an asynchronous condition thereof for facilitating engagement of said members to provide said direct drive, and drive control means operable in response to operation of said throttle valve actuator in its second range of movement to effect disengagement of said clutch members.

7. In the drive for a motor vehicle having an engine provided with a throttle valve actuator operable by the driver throughout a range of movement in adjusting the throttle valve between its fully opened and closed positions, means accommodating driver operation of said throttle valve actuator throughout its range of movement and therebeyond in a second range of movement overtraveling the throttle valve, a drive shaft adapted to receive drive from the engine, a driven shaft adapted to drive the vehicle, means for driving the driven shaft from the driving shaft releasable to accommodate a relatively faster drive of the driven shaft directly from the driving shaft, clutch means comprising a toothed clutch member rotatable with said drive shaft, a toothed clutch member rotatable with said driven shaft, said last clutch member being adapted for movement to engage said first clutch member upon synchronous rotation thereof, means adapted to hold said clutch members in synchronism after bringing said members to synchronous condition from an asynchronous condition thereof for facilitating engagement of said members to provide said relatively faster drive, and drive control means operable in response to operation of said throttle valve actuator in said second range of movement to effect disengagement of said clutch members.

8. In the drive for a motor vehicle having an engine provided with a throttle valve actuator operable by the driver throughout a range of movement in adjusting the throttle valve between its fully opened and closed positions, means accommodating driver operation of said throttle valve actuator throughout its range of movement and therebeyond in a second range of movement overtraveling the throttle valve, a drive shaft adapted to receive drive from the engine, a driven shaft adapted to drive the vehicle, means for driving the driven shaft from the driving shaft releasable to accommodate a relatively faster drive of the driven shaft from the driving shaft, clutch means comprising a clutch member rotatable with said drive shaft, a clutch member rotatable with said driven shaft, said last clutch member being adapted for movement to engage said first clutch member means including said clutch means when the members thereof are synchronously engaged to provide said relatively faster drive, control means operable in response to operation of said throttle valve actuator in said second range of movement to effect disengagement of said clutch members, means continuously yieldably urging said clutch members into engagement during forward driving of the vehicle and means controlled by the speed of said driven shaft within a predetermined range of speed thereof for rendering said disengaging means inoperable to effect disengagement of said clutch members when said clutch members are engaged.

9. In a power transmission for driving a motor vehicle having an engine provided with a throttle valve and driver operated means for adjusting said valve, a drive shaft adapted to be driven by said engine, a driven shaft adapted to drive the vehicle, positively interengageable clutching members carried by said driven and drive shafts respectively, one of which is adapted for movement to engage the other of said clutching members to establish a direct drive connection between said shafts, additional means for drivingly connecting said shafts, said last-mentioned means comprising gearing for driving said driven shaft from said drive shaft at a speed different from that of the drive shaft when said clutching members are disengaged, a spring-opposed electrically operated actuating member adapted to operate said movable clutch member and operable in response to operation of said throttle valve adjusting means in a throttle opening direction for effecting disengagement of said clutching members and means for interrupting the flow of power to said drive shaft to facilitate said disengagement.

10. In a power transmission for driving a motor vehicle having an engine provided with a throttle valve and driver operated means for adjusting said valve, a drive shaft adapted to be driven by said engine, a driven shaft adapted to drive the vehicle, clutching members carried by said driven and drive shafts respectively, one of which is adapted for movement to engage the other of said clutching members to establish a direct drive connection between said shafts, means limiting engagement of said clutching members to substantially synchronous rotation thereof, additional driving means for releasably driving the driven shaft from the driving shaft independently of said clutching means, said clutching members being driven at relatively different speeds during operation of said additional driving means, and means for facilitating clutching of said clutching members upon release of said additional driving means.

11. In a power transmission for driving a motor vehicle having an engine provided with a throttle valve and driver operated means for adjusting said valve, a drive shaft adapted to be driven by said engine, a driven shaft adapted to drive the vehicle, clutching members carried by said drive and driven shafts respectively one of which is adapted for movement to engage the other of said clutching members to establish a direct drive connection between said shafts, means for moving said clutch members into engagement means limiting engagement of said clutching members to substantially synchronous rotation thereof, additional driving means for releasably driving the driven shaft from the driving shaft independently of said clutching means, said clutching members being driven at relatively different speeds during operation of said additional driving means, and means comprising an overrunning device operable upon release of said additional driving means, for clutching said shafts together when the speed of the drive shaft clutch member is made synchronous with the driven shaft clutch member, and means operable incident to operation of said clutch moving means for altering the speed of the drive shaft.

12. In a drive for a motor vehicle having an engine provided with a throttle valve actuator operable by the driver throughout a normal range of movement for adjusting the throttle valve between its fully opened and closed positions, means accommodating operation of said throttle valve actuator throughout said normal range of movement and therebeyond in a second range of movement overtraveling said throttle valve, a drive shaft adapted to receive drive from the engine, a driven shaft adapted to drive the vehicle, clutch members on each of said shafts one of which is adapted for movement to engage the other to establish direct drive between said shafts, additional means including gearing for driving the driven shaft from the drive shaft at a speed different from that of the drive shaft when said clutching members are disengaged, and control means including vehicle speed responsive means and an electrically actuated prime mover element operable in response to operation of said throttle valve actuator in said second range of movement for effecting disengagement of said clutching members said speed responsive means including a fluid pressure responsive switch.

13. In a drive for a motor vehicle having an engine provided with a throttle valve actuator operable by the driver throughout a normal range of movement for adjusting the throttle valve between its fully opened and closed positions, means accommodating operation of said throttle valve actuator throughout said normal range of movement and therebeyond in a second range of movement overtraveling said throttle valve, a drive shaft adapted to receive drive from the engine, a driven shaft adapted to drive the vehicle, clutch members on each of said shafts one of which is adapted for movement to engage the other to establish a drive between said shafts, additional means including gearing for driving the driven shaft from the drive shaft at a speed different from that of the drive shaft while said clutching members are disengaged, control means including vehicle speed responsive means and an electrically actuated prime mover element operable in response to operation of said throttle valve actuator in said second range of movement for effecting disengagement of said clutching members, means responsive to movement of said throttle valve actuator from said second range of movement to said normal range of movement for reengaging said clutching members, said vehicle speed responsive means being also operable at or below a predetermined vehicle speed for preventing disengagement of said clutching members by said control means.

14. In a power transmission for driving a motor vehicle having an internal combustion engine provided with an electrical ignition circuit, a throttle and a driver manipulated throttle control, a drive shaft adapted to receive drive from the engine, a driven shaft adapted to drive said vehicle, gear means operable between said shafts for releasably driving the driven shaft from the drive shaft, a releasable clutching device adapted to establish a direct drive connection between said shafts, yieldable means constantly urging said clutching device into direct driving position, means including a solenoid for selectively controlling operation of said clutching device, means responsive to manipulation of said throttle control for controlling energization of said solenoid, means automatically operating in response to energization of said solenoid for momentarily interrupting the electrical ignition circuit, and further means responsive to energization of said solenoid for releasing said clutching device.

15. In a power transmission for driving a motor vehicle having an internal combustion engine, a throttle valve, and a driver manipulated throttle control adapted to have a normal range of movement for adjusting the throttle valve between its fully opened and closed positions, means accommodating movement of said throttle valve control throughout a second range of movement overtraveling said throttle valve, a drive shaft adapted to receive drive from the engine, a driven shaft adapted to drive said vehicle, gear means operable between said shafts for releasable forward driving of the driven shaft from the drive shaft, a releasable clutching device adapted to establish a direct drive connection between said shafts, yieldable means constantly urging said clutching device into direct driving position, means including a solenoid for selectively controlling operation of said clutching device, means responsive to manipulation of said throttle control in said second range of movement for controlling energization of said solenoid, means responsive to manipulation of said throttle control in said second range of movement for momentarily closing said throttle, and means responsive to energization of said solenoid for releasing said clutching device.

16. In a drive for a motor vehicle having an engine provided with a throttle valve and having a throttle valve actuator operable by the driver throughout a normal range of movement in adjusting the throttle valve between its fully opened and closed positions, means accommodating driver operation of said throttle valve actuator throughout said normal range of movement and therebeyond in a second range of movement overtraveling the throttle valve, a drive shaft adapted to receive drive from the engine, a driven shaft adapted to drive the vehicle, releasable means for driving said driven shaft directly from said drive shaft, additional releasable means for driving said driven shaft from said drive shaft at a speed different from that of the drive shaft, means for maintaining one of said drive means inoperable while the vehicle is driven by the other of said drive means, means operable in response to manipulation of said throttle valve actuator in its second range of movement for shifting the drive of said vehicle to said inoperable drive means, means operable in response to manipulation of said throttle valve actuator in its second range of movement for momentarily closing (at least partially) said throttle valve and speed responsive means operable within a predetermined range of speed when the vehicle is driven by said one drive means for preventing shift of the drive to said inoperable drive means by manipulation of said actuator in its second range of movement.

17. In a drive for a motor vehicle having an engine provided with a throttle valve and having a throttle valve actuator operable by the driver throughout a normal range of movement in adjusting the throttle valve between its fully opened and closed positions, means accommodating driver operation of said throttle valve actuator throughout said normal range of movement and therebeyond in a second range of movement overtraveling the throttle valve, a drive shaft adapted to receive drive from the engine, a driven shaft adapted to drive the vehicle, releasable means for driving said driven shaft directly from said drive shaft, additional releasable means for driving said driven shaft from said drive shaft at a speed different from that of the drive shaft, means for maintaining one of said drive means inoperable while the vehicle is driven by the other of said drive means, means operable in response to manipulation of said throttle valve actuator in its second range of movement for shifting the drive of said vehicle to said inoperable drive means, means operable in response to manipulation of said throttle valve actuator in its second range of movement for momentarily closing (at least partially) said throttle valve, speed responsive means operable within a predetermined range of speed when the vehicle is driven by said one drive means for preventing shift of the drive to said inoperable drive means by manipulation of said actuator in its second range of movement and means responsive to movement of said actuator from said second range of movement for restoring the drive through said other drive means.

18. In a power transmission for driving a motor vehicle having an internal combustion engine provided with a throttle valve and driver operable control for adjusting said valve between its fully opened and closed positions, a driving shaft adapted to receive drive from said engine, a driven shaft adapted to drive said vehicle, a plurality of speed ratio mechanisms adapted to drivingly connect said shafts, means for causing said shafts to be selectively drivingly connected through said speed ratio mechanisms, means for causing the drive connection between said shafts to be shifted from one of said speed ratio mechanisms to another in response to movement of said throttle valve control to wide open throttle position, said shifting means comprising a power actuator operably connected to one of said mechanisms and fluid pressure responsive means for controlling said actuator, and means for securing momentary reversal of drive through said transmission to accommodate said shift, said last means comprising means for momentarily cutting off the supply of fuel to said engine.

19. In a power transmission for driving a motor vehicle having an internal combustion engine provided with a device for supplying fuel to the cylinders of said engine, a throttle valve and a driver operable control for said valve, a driving shaft adapted to receive drive from said engine, a driven shaft adapted to drive said vehicle, a plurality of speed ratio mechanisms adapted to drivingly connect said shafts, means for causing said shafts to be selectively drivingly connected through said speed ratio mechanism, means for causing the drive connection between said shafts to be shifted from one of said speed ratio mechanisms to another in response to movement of said throttle valve control to wide open throttle position, means responsive to vehicle speed for controlling said drive connection means such that said shift from said one speed ratio mechanism in response to movement of the throttle control to wide open throttle position may be prevented within a predetermined range of vehicle speed, and means for securing momentary reversal of drive through said transmission to accommodate said shift, said last means comprising means associated with said fuel supplying device for momentarily cutting off the supply of fuel to said engine.

20. In a power transmission for driving a motor vehicle, a pair of shafts, means operable to drivingly connect one of said shafts with the other in a speed ratio drive including releasable drive control means operable to establish said drive connection of the said one shaft with the other shaft, means automatically acting at a predetermined speed of the vehicle in response to accelerating the vehicle from rest for establishing a different speed ratio drive between said shafts, and incident thereto releasing said releasable drive control means, a driven shaft adapted to drive the vehicle, means for clutching said driven shaft to the said other drive shaft to establish direct drive between said shafts, additional drive means for driving said driven shaft from the said other drive shaft at a different speed with respect thereto including countershaft gearing and an overrunning device having a drive element driven by said other shaft and a driven element drivingly connected to said driven shaft, and driver controlled means for selectively controlling said clutching means.

21. In a motor vehicle, in combination, an engine, a fluid impeller driven by said engine, primary and secondary runners driven by circulation of pressure fluid from said impeller, a primary drive shaft drivingly connected to said primary runner, a secondary drive shaft drivingly connected to said secondary runner, means operable to drive the secondary drive shaft from the primary drive shaft including releasable drive control means operable to establish operation of said driving means and means automatically acting at a predetermined speed of the vehicle in response to accelerating the vehicle from rest for operating said drive control means, a driven shaft adapted to drive the vehicle, means for clutching said driven shaft to said secondary drive shaft to establish direct drive between said shafts, additional drive means for driving said driven shaft from said secondary drive shaft at a different speed with respect thereto including countershaft gearing and an overrunning device having a drive element driven by said secondary drive shaft and a driven element drivingly connected to said driven shaft, and driver controlled means for selectively controlling said clutching means, said driven shaft being normally adapted for drive from the engine directly through said secondary drive shaft or through said primary and secondary drive shafts drivingly connected as aforesaid when said driven shaft is clutched to said secondary drive shaft or is released for drive by said different driving means.

22. In a motor vehicle power transmission, an engine shaft, a fluid coupling including a rotatable impeller driven by said engine shaft for circulating a fluid in said coupling and a runner adapted to be driven by the circulated fluid, a drive shaft adapted for driving connection with said runner, a driven shaft, means operable for selectively drivingly connecting said drive and driven shafts for drive therebetween in the same direction of rotation or in an opposite direction of rotation, braking means for retarding rotation of said runner to facilitate operation of said selectively operable connecting means, and control means operable for rendering said braking means inoperative when said driven shaft has reached a predetermined speed of rotation representing a vehicle speed above engine idling speed but under high speed.

23. In a motor vehicle power transmission, an engine shaft, a fluid coupling including a rotatable impeller driven by said engine shaft for circulating a fluid in said coupling and a runner adapted to be driven by the circulated fluid, a drive shaft adapted for driving connection with said runner, a driven shaft, means operable for selectively drivingly connecting said drive and driven shafts for drive therebetween in the same direction of rotation or in an opposite direction of rotation, braking means for retarding rotation of said runner to facilitate operation of said selectively operable connecting means, and means for rendering said braking means inoperative when said driven shaft has reached a predetermined speed of rotation comprising a pump driven by said driven shaft.

24. In a motor vehicle power transmission, an engine shaft, a fluid coupling including a rotatable impeller driven by said engine shaft for circulating a fluid in said coupling and a runner adapted to be driven by the circulated fluid, a drive shaft adapted for driving connection with said runner, a driven shaft, means operable for selectively drivingly connecting said drive shaft with said driven shaft for drive therebetween in the same direction of rotation or in an opposite direction of rotation, fluid actuated braking means for retarding rotation of said runner to facilitate operation of said selectively operable connecting means, valve means for controlling said braking means, and means for rendering said braking means inoperable when said driven shaft has reached a predetermined speed of rotation comprising a pump driven by said driven shaft and means operable under the influence of said pump to cut off communication between said valve means and said braking means.

25. In a motor vehicle transmission having lubricating passages, an engine shaft, a fluid coupling including a rotatable impeller driven by said engine shaft for circulating the fluid in said coupling and a runner adapted to be driven by the circulated fluid, braking means for retarding rotation of said runner, a fluid actuated motor for controlling said braking means, a pump driven by said impeller, driver actuated valve means for controlling the flow of fluid from said pump to said motor, said valve means being adapted to have two positions of operation one of which admits fluid from said pump to said motor and the other of which admits fluid from said pump to said lubricating passages.

26. In a motor vehicle power transmission, a drive shaft adapted to receive drive from the motor of said vehicle, a driven shaft adapted to drive said vehicle, change speed mechanism comprising means selectively operable for obtaining drive of said driven shaft forwardly in a plurality of relatively different speed ratios or reversely from said drive shaft, clutching members rotatable with each of said shafts, means for yieldably establishing said clutching members in driving engagement upon reversal of driving torque incident to manipulation of said selectively operable means to forward drive position, means for driving said driven shaft from said drive shaft at reduced speed relative thereto including gearing and an overrunning device, said reduced speed driving means being automatically operable to effect said reduced speed drive upon disengagement of said clutching members while said selectively operable means is in forward drive position, and means operable independently of said selectively operable means for disengaging said clutching members from driving engagement thereof when the selectively operable means is in said forward drive position, the said independently operable means being inoperable to obtain said disengagement of the said clutching members within a predetermined range of vehicle speed.

27. In a motor vehicle transmission, a drive shaft adapted to receive drive from the motor of said vehicle, a driven shaft adapted to drive said vehicle forwardly in a plurality of different speed ratios or in reverse, a clutch member carried by and rotatable with said drive shaft, a sleeve slidably splined on said driven shaft and carrying a clutch member adapted for movement to engage said other clutch member in direct drive, a second sleeve surrounding said first sleeve, an overrunning device drivingly connecting said sleeves and so constructed and arranged that said first sleeve may forwardly overrun said second sleeve, and means adapted for driving said second sleeve from said drive shaft at a relatively reduced speed operable automatically upon disengagement of said clutch members.

28. In a motor vehicle transmission, a drive shaft adapted to receive drive from the motor of said vehicle, a driven shaft adapted to drive said vehicle forwardly in a plurality of different speed ratios or in reverse, a clutch member rotatable with said drive shaft, a sleeve slidably splined on said driven shaft and carrying a clutch member adapted for movement to engage said other clutch member, a second sleeve surrounding said first sleeve, an overrunning device drivingly connecting said sleeves and so constructed and arranged that said first sleeve may forwardly overrun said second sleeve, means adapted for driving said second sleeve from said drive shaft at a relatively reduced speed, means adapted for driving said second sleeve from said drive shaft in reverse direction with respect thereto and means for locking said overrunning device out of operation during reverse driving.

29. In a motor vehicle transmission, a drive shaft adapted to receive drive from the motor of said vehicle, a driven shaft adapted to drive said vehicle forwardly in a plurality of different speed ratios or in reverse, a clutch member carried by and rotatable with said drive shaft, a sleeve slidably splined on said driven shaft and carrying a clutch member adapted for movement to engage said other clutch member, a second sleeve surrounding said first sleeve, an overrunning device drivingly connecting said sleeves and so constructed and arranged that said first sleeve may forwardly overrun said second sleeve, means adapted for driving said second sleeve from said drive shaft at a relatively reduced speed, means adapted for driving said second sleeve from said drive shaft in reverse direction with respect thereto, and selectively operable means for sliding said sleeves axially of said driven shaft from a neutral, non-driving position, to a forward driving position or to a reverse driving position.

30. In a motor vehicle transmission, a drive shaft adapted to receive drive from the motor of said vehicle, a driven shaft adapted to drive said vehicle forwardly in a plurality of different speed ratios or in reverse, a clutch member rotatable with said drive shaft, a sleeve slidably splined on said driven shaft and carrying a clutch member adapted for movement to engage said other clutch member, a second sleeve surrounding said first sleeve, an overrunning device drivingly connecting said sleeves and so constructed and arranged that said first sleeve may forwardly overrun said second sleeve, means adapted for driving said second sleeve from said drive shaft at a relatively reduced speed, means including an idler gear adapted for driving said second sleeve from said drive shaft in reverse direction with respect thereto, means for locking said overrunning device out of operation during reverse driving, and selectively operable means for sliding said sleeves axially of said driven shaft from a neutral non-driving position, to a forward driving position wherein said clutch members are adapted for engagement and said second sleeve is driven from said drive shaft, or to a reverse driving position wherein said second sleeve is driven by said idler gear.

31. In a motor vehicle transmission, a drive shaft adapted to receive drive from the motor of said vehicle, a driven shaft adapted to drive said vehicle forwardly in a plurality of different speed ratios or in reverse, a clutch member rotatable with said drive shaft, a sleeve slidably splined on said driven shaft and carrying a clutch member adapted for movement to engage said other clutch member, a second sleeve surrounding said first sleeve, an overrunning device drivingly connecting said sleeves and so constructed and arranged that said first sleeve may forwardly overrun said second sleeve, means adapted for driving said second sleeve from said drive shaft at a relatively reduced speed, means including an idler gear adapted for driving said second sleeve from said drive shaft in reverse direction with respect thereto, means for clutching said second sleeve to said driven shaft during reverse driving, and selectively operable means for sliding said sleeves axially of said driven shaft from a neutral non-driving position, to a forward driving position wherein said clutch members are adapted for engagement and said second sleeve is driven from said drive shaft, or to a reverse driving position wherein said second sleeve is driven by said idler gear and is clutched to said driven shaft.

32. In a motor vehicle power transmission, a drive shaft adapted to receive drive from the engine of said vehicle, means for driving said drive shaft from said engine comprising a fluid coupling including a rotatable impeller driven by said engine for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, means directly connecting said secondary runner with said drive shaft, gear train driving means adapted to drivingly connect said primary runner with said drive shaft for transmitting a torque multiplying drive from said primary runner to said drive shaft, said torque multiplying driving means including an overrunning clutch interposed in the drive from said primary runner to said drive shaft, and so constructed and arranged as to provide overrunning of said primary runner by said shaft incident to step-up in speed ratio drive of said drive shaft, a driven shaft adapted to drive said vehicle, releasable means for clutching said driven shaft to said drive shaft, means automatically operable in response to release of said releasable means for driving said driven shaft from said drive shaft at a relatively different speed, and means for selectively controlling said releasable driving means, said transmission being normally operable to provide a speed ratio drive of said driven shaft from the engine through said torque multiplying means and drive shaft or a drive from the engine through said drive shaft without the torque multiplication of said torque multiplying means when said driven shaft is clutched to said drive shaft or is driven therefrom by said different speed driving means.

33. In a motor vehicle power transmission, a drive shaft adapted to receive drive from the engine of said vehicle, means for driving said drive shaft from said engine comprising a fluid coupling including a rotatable impeller driven by said engine for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, means directly connecting said secondary runner with said drive shaft, gear train driving means adapted to drivingly connect said primary runner with said drive shaft for transmitting a torque multiplying drive from said primary runner to said shaft, said torque multiplying driving means including an overrunning clutch interposed in the drive from said primary runner to said drive shaft, and so constructed and arranged as to provide overrunning of said primary runner by said shaft, a driven shaft adapted to drive said vehicle, releasable means for clutching said driven shaft to said drive shaft, releasable means for driving said driven shaft at a different speed from the speed of said drive shaft, means for selectively controlling said releasable driving means, means operable for arresting rotation of one of said runners during rotation of said impeller and means operable by said driven shaft for preventing operation of said arresting means when said driven shaft has reached a predetermined speed of rotation.

34. In a motor vehicle power transmission, a drive shaft adapted to receive drive from the engine of said vehicle, means for driving said drive shaft from said engine comprising a fluid coupling including a rotatable impeller driven by said engine for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, means directly connecting said secondary runner with said drive shaft, gear train driving means adapted to drivingly connect said primary runner with said drive shaft for transmitting a torque multiplying drive from said primary runner to said shaft, said torque multiplying driving means including an overrunning clutch interposed in the drive from said primary runner to said drive shaft, and so constructed and arranged as to provide overrunning of said primary runner by said shaft, a driven shaft adapted to drive said vehicle, releasable means for clutching said driven shaft to said drive shaft, releasable means for driving said driven shaft at a different speed from the speed of said drive shaft, said torque multiplying driving means being automatically operable to increase the torque applied to said drive shaft by said engine during vehicle drive when driving conditions demand an increase in said torque and said different speed driving means being normally operable by the driver to change the driving ratio between said drive and driven shafts from a condition of drive of said driven shaft from the engine through said torque multiplying means and said drive shaft or from said engine through said drive shaft without the torque multiplication of said torque multiplying means.

35. In a motor vehicle power transmission, a drive shaft adapted to receive drive from the motor of said vehicle, a driven shaft adapted to drive said vehicle, a countershaft driven by said drive shaft, a reverse gear driven by said countershaft, means for drivingly connecting said driven shaft with said driven shaft whereby said driven shaft may be driven at a plurality of different speeds and directions with respect to said drive shaft comprising a sleeve slidably splined on said driven shaft, a second sleeve carried by said first sleeve for sliding movement therewith, means for drivingly connecting the second sleeve to said countershaft, an overrunning clutch drivingly connecting said sleeves and so arranged that said first sleeve may overrun said second sleeve in a forward direction, means for sliding said sleeves from a neutral position wherein no drive is imparted to said driven shaft by said drive shaft, to a forward driving position wherein said driven shaft is directly connected with said drive shaft and said second sleeve is driven by said countershaft from said drive shaft, or to a reverse driving position wherein said second sleeve is driven by said reverse gear, and means for clutching said second sleeve to said driven shaft when said sleeves are in reverse driving position.

36. In a motor vehicle power transmission, a drive shaft adapted to receive drive from the motor of said vehicle, a driven shaft adapted to drive said vehicle, a countershaft driven by said drive shaft, a reverse gear driven by said countershaft, means for drivingly connecting said driven shaft with said drive shaft whereby said driven shaft may be driven at a plurality of different speeds and directions with respect to said drive shaft comprising a sleeve slidably splined on said driven shaft, a second sleeve carried by said first sleeve for sliding movement therewith, means for drivingly connecting the second sleeve to said countershaft an overrunning clutch drivingly connecting said sleeves and so arranged that said first sleeve may overrun said second sleeve in a forward direction, means for sliding said sleeves from a neutral position wherein no drive is imparted to said driven shaft by said drive shaft, to a forward driving position wherein said driven shaft is directly connected with said drive shaft and said second sleeve is driven by said countershaft from said drive shaft, or to a reverse driving position wherein said second sleeve is driven by said reverse gear, and means for clutching said second sleeve to said driven shaft when said sleeves are in reverse driving position.

37. In a drive for a motor vehicle having an engine, transmission mechanism operable to provide a drive between the engine and the vehicle, said mechanism including positively engagable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust application is relieved; an ignition system for said engine adapted to be interrupted to relieve said thrust application; power actuated means for controlling movement of said movable element and for interrupting said ignition system; a control element adapted for operation by the driver to effect operation of said power actuated means; and fluid pressure operated means including a pump driven by the vehicle operatively associated with said control element for rendering said power actuated means inoperative, said means being operably responsive to vehicle speed and being adapted to be responsive to substantially the same vehicle speed for all forward drives of the transmission.

38. In a drive for a motor vehicle having an engine and a driven shaft, transmission mechanism operable to provide a drive between the engine and the driven shaft, said mechanism including positively engageable clutch elements one of which is movable into engaging relationship with the other to accommodate said drive and into disengaging relationship with respect to said other element to release said drive, said elements when relatively engaged being subjected to thrust-application therebetween during said drive so as to resist relative disengagement thereof to release said drive until said thrust application is relieved; an ignition system for said engine adapted to be interrupted to relieve said thrust application; electrically controlled power actuated means for controlling movement of said movable element and for interrupting said ignition system; a switch adapted for operation by the driver to effect operation of said power actuated means; and a pressure fluid operated switch means operatively associated with said driver operable switch and operatively responsive to operation of said driven shaft for preventing operation of said power means by said driver operable switch.

39. In a drive for a motor vehicle having an engine, transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position to a second position thereof, said second position providing a thrust-transmitting relationship with respect to said follower member when the latter is in its said first position; electrically controlled power means for actuating said leader member to disengage said drive control elements; means for controlling operation of said power means including a driver operable switch; and fluid pressure actuated means operatively associated with said power means for preventing energization of said power means in response to operation of said switch to certain predetermined vehicle operating conditions.

40. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; said slow and intermediate speed ratio drives each including at least one reduction gear set; means operably responsive to a lessening of torque demand on said driven shaft for effecting automatic step-up during vehicle drive in the driving speed ratio of the transmission from said slow speed drive to said intermediate speed drive; and means operable at the will of the driver for effecting step-up in the driving speed ratio from said intermediate speed drive to said fast speed drive.

41. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; said slow and intermediate speed ratio drives each including at least one reduction gear set; means operably responsive to a lessening of torque demand on said driven shaft for effecting automatic step-up during vehicle drive in the driving speed ratio of the transmission from said slow speed drive to said intermediate speed drive; and means operable at the will of the driver for effecting step-up in the driving speed ratio from said intermediate speed drive to said fast speed drive; power actuated means for effecting the step-up to said fast speed drive, and means preventing establishment of said fast speed drive when the engine is driving the vehicle, but accommodating said drive establishment when the engine is allowed to coast.

42. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; drive control means including a multiple rotor fluid coupling having reduction gearing between certain rotors for automatically effecting infinitely variable step-up in the driving speed ratio from slow speed to intermediate speed drive; and drive control means for effecting step-up in the driving speed ratio from intermediate speed drive to fast speed drive, said last step-up in ratio being effected at the will of the driver.

43. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives, drive control means including a multiple rotor fluid coupling having reduction gearing between certain rotors for effecting an automatic infinitely variable increase in driving ratio from slow speed to intermediate speed drive, and drive control means for effecting instantaneous step-up in driving ratio from intermediate speed to fast speed drive.

44. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; drive control means for effecting an automatic infinitely variable increase in driving ratio from slow speed to intermediate speed drive, and drive control means including a multiple rotor fluid coupling having reduction gearing between certain rotors for effecting instantaneous step-up in driving ratio from intermediate speed to fast speed drive; said last drive control means being operable independently of said first drive control means.

45. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; drive control means for effecting an automatic infinitely variable increase in driving ratio from slow speed to intermediate speed drive, and drive control means including a multiple rotor fluid coupling having reduction gearing between certain rotors for effecting instantaneous step-up in driving ratio from intermediate speed to fast speed drive; said last drive control means being operable at the will of the driver independently of the operation of said first drive control means.

46. In a power transmission for driving a motor vehicle having an engine, change speed mechanism including a rotatable driving member adapted to be driven by the engine, a rotatable driven member adapted to drive the vehicle, and means operable for drivingly connecting said members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; torque multiplying means including relatively rotatable fluid members certain of which are interconnected by reduction gearing for effecting progressive step-up in the driving speed ratio from slow speed to intermediate speed drive; and means including a shiftable gearset for effecting step-up from intermediate speed to fast speed drive.

47. In a power transmission for driving a motor vehicle having an engine, change speed mechanism including a rotatable driving member adapted to be driven by the engine, a rotatable driven member adapted to drive the vehicle, and means operable for drivingly connecting members in a plurality of different speed ratio drives, one a relatively slow speed ratio drive, another an intermediate speed ratio drive which is relatively faster than said slow speed ratio drive, and a fast speed ratio drive which is relatively faster than either of said slow and intermediate speed ratio drives; torque multiplying means including a fluid torque transmitting device having relatively rotatable members certain of which all interconnected by reduction gearing for automatically effecting step-up in the driving speed ratio from slow speed to intermediate speed drive, said torque multiplying means then being adapted for operation as a fluid slip coupling, and means operable at the will of the driver for effecting step-up in the driving speed ratio from interemdiate speed ratio to fast speed ratio.

48. In a power transmission for driving a motor vehicle having an engine, a driving shaft adapted to be driven by the engine; a driven shaft adapted to drive the vehicle; torque multiplying means for drivingly connecting said two shafts including a hydraulic multiple rotor coupling torque transmitting device adapted for operation as a torque multiplier at relatively low vehicle speeds and as a fluid coupling of the kinetic type at relatively high vehicle speeds; and an additional torque multiplying means operably drivingly connecting the said shafts, said last means being normally conditioned in a drive ratio that does not provide multiplying torque; and control means operable by the driver for automatically establishing operation of said additional torque multiplying means in a torque multiplying drive ratio.

49. In a power transmission for driving a motor vehicle having an engine and a throttle control therefore, a driving shaft adapted to be driven by the engine; a driven shaft adapted to drive the vehicle; torque multiplying means for drivingly connecting said two shafts including a hydraulic multiple rotor coupling having gear change speed means between certain rotors, said coupling being adapted for operation as a torque multiplier at relatively low vehicle speeds through said change speed means and as a fluid coupling of the kinetic type without torque multiplication at relatively high vehicle speeds; a speed reducing gearset drivingly connected between said shafts and operable in a pair of speed ratio drives, one of which is a reduced speed drive; control means for controlling said gearset to effect said speed ratio drives; driver operable means for controlling said throttle control of said engine and operable between a normally throttle closed position and a wide open throttle position; and means operably associating said gearset control and said throttle control operable for effecting establishment of reduced speed drive through said gearset in response to manipulation of said throttle control to wide-open-throttle position.

50. In a drive for a motor vehicle having an engine, a throttle valve, and a throttle valve control operable by the driver, transmission mechanism operable to provide a drive from the engine to the vehicle, said mechanism including positively engageable drive control elements, one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved, and means operable by operation of the throttle control in throttle valve opening direction for simultaneously biasing one of said elements toward drive-releasing position and momentarily relieving said thrust-application while maintaining at least partial torque delivery of said engine and means responsive to vehicle speed for preventing within a predetermined range of speed said drive releasing biasing operation.

51. In a drive for a motor vehicle having an engine, transmission mechanism operable to provide a drive from the engine to the vehicle, said mechanism including positively engageable drive control elements, one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved, a driver operable throttle control for said engine, means operable to bias said movable element toward its said disengaging relationship, and means operable in response to manipulation of said throttle control to substantially the limit of its travel in the throttle-opening direction for effecting operation of said biasing means accompanied by momentary relief of said thrust-application while maintaining at least partial torque delivery of said engine said throttle control including means for determining the period of thrust relief.

52. In a motor vehicle power transmission, a drive member adapted to receive drive from the vehicle motor, a driven member, means including an overrunning clutch for drivingly connecting said drive and driven members in one speed ratio drive, a rotatable clutch member drivingly connected to said drive member, a clutch member drivingly connected to said driven member, releasable means operable for effecting driving connection between said clutch members when their rotatable speeds are substantially synchronous to establish a different speed ratio drive between said drive and driven members and releasable to return said drive and driven members to said one speed ratio drive, said clutch members and releasable means including toothed elements positively interengageable upon operation of said releasable means to establish said different drive means controlling said releasable means for effecting clutching and release of said clutch members and means comprising a reverse type free wheel clutch device operably associated with said drive and driven members and operable from a condition of release of said clutch members and asynchronous speeds thereof for limiting the change in speed of one of said drive or driven members to that of the other on approaching synchronous speed therebetween, thereby to effectively facilitate positive clutching of said clutch members to re-establish said different speed ratio drive between said drive and driven members.

53. In a power transmission having an engine; a driving structure adapted to receive drive from the engine, a driven structure adapted to receive drive from the driving structure for driving the vehicle, change speed mechanism operably connecting said structures, means for manipulating said change speed mechanism for effecting at least two different speed ratio drives between said structures one of which two drives is faster than the other, a driver operated control element operable when the vehicle is conditioned for said fast speed ratio drive, for producing automatic operation of said manipulating means to effect a step-down from the faster to the slower of said speed ratio drives between said structures, and speed responsive means operable at or below a predetermined vehicle speed when the vehicle is conditioned in said faster speed drive to prevent said step-down by operation of said control element.

54. In a power transmission having an engine provided with an ignition system, a driving structure adapted to receive drive from the engine, a driven structure adapted to receive drive from the driving structure for driving the vehicle, change speed mechanism operably connecting said structures, means for manipulating said change speed mechanism for effecting at least two different speed ratio drives between said structures one of which is faster than the other, a driver operated control element operable for producing automatic operation of said manipulating means and interruption in operation of said ignition system for effecting step-down from the faster to the slower of said speed ratio drives between said structures and speed responsive means operable at or below a predetermined vehicle speed when the vehicle is conditioned in said faster speed drive to prevent said ignition interruption by said drive operated control element.

55. In a motor vehicle power transmission, a drive shaft adapted to receive drive from the motor of said vehicle, a driven shaft adapted to drive said vehicle, change speed mechanism comprising means selectively operable for obtaining drive of said driven shaft forwardly in a plurality of relatively different speed ratio drives or reversely from said drive shaft, clutching members rotatable with each of said shafts, means for yieldably establishing said clutching members in driving engagement upon manipulation of said selectively operable means to forward drive position, means for driving said driven shaft from said drive shaft at reduced speed relative thereto including gearing and an overrunning device, said reduced speed driving means being automatically operable to effect said reduced speed drive upon disengagement of said clutching members when said selectively operable means is conditioned in forward drive position, driver operable means operable independently of said selectively operable means for disengaging said clutch members when said selectively operable means is conditioned in forward drive position and means for holding said driver operable means in position to effect sustained disengagement of said clutching members.

56. In a motor vehicle power transmission, a drive shaft, a fluid power transmitting device adapted to receive drive from the motor of said vehicle for driving the drive shaft, a driven shaft adapted to drive said vehicle, means for driving said driven shaft forwardly in direct drive with said driven shaft including releasable positively interengageable toothed clutching members rotatable with each of said shafts for establishing said drive, means for driving said driven shaft from said drive shaft in a reduced speed drive relative thereto including gearing and an overrunning device, said reduced speed driving means being automatically operable to effect said reduced speed drive upon release of said clutching members, and means intermediate said drive and driven shafts for facilitating engagement of said toothed clutching members and for establishing a positive direct drive from the driven shaft to the drive shaft upon coast of the vehicle irrespective of the relationship between said clutching members.

57. In a power transmission for driving a motor vehicle having an engine provided with a throttle valve and driver operated means for adjusting said valve, a drive shaft adapted to be driven by said engine, a driven shaft adapted to drive the vehicle, clutching members carried by said driven and drive shafts respectively, one of which is adapted for movement to engage the other of said clutching members to establish a direct drive connection between said shafts, each of said clutching members comprising a set of clutching teeth having ramped end portions adapted for ratcheting engagement with the ramped end portions of the other set of clutch teeth thereby to prevent interengagement of said sets of clutch teeth during asynchronous rotation of said clutching members, additional means for drivingly connecting said shafts, said last-mentioned means comprising gearing for driving said driven shaft from said drive shaft at a speed different from that of the drive shaft when said clutching members are disengaged, an electrically energizable device having an operating member, means operably connecting said operating member with said movable clutching member for moving the latter to effect disengagement of said sets of clutch teeth, and means operable in response to operation of said throttle valve adjusting means for controlling energization of said electrically energizable device.

58. In a power transmission for driving a motor vehicle having an engine provided with a throttle valve and driver operated means for adjusting said valve, a drive shaft adapted to be driven by said engine, a driven shaft adapted to drive the vehicle, clutching members carried by said driven and drive shafts respectively, one of which is adapted for movement to engage the other of said clutching members to establish a direct drive connection between said shafts, additional means for drivingly connecting said shafts, said last-mentioned means comprising gearing for driving said driven shaft from said drive shaft at a speed different from that of the drive shaft when said clutching members are disengaged, a lever operably connected to said movable clutching member, a spring acting to bias operation of said lever in a direction urging said movable clutching member into clutching engagement with the other of said clutching members, an actuating member having an operable connection with said lever, a solenoid for effecting operation of said actuating member, and means operable in response to operation of said throttle valve adjusting means for so controlling energization of said solenoid as to cause said actuating member to operate said lever in opposition to the bias of said spring thereby to effect disengagement of said clutching members.

59. In a torque transmitting mechanism for a prime mover having an ignition system, means for multiplying the torque of the prime mover, positive clutch means in parallel with the torque multiplying means, said positive clutch means having a movable element for controlling the engagement and disengagement thereof, means for impressing a force upon the movable member of the clutch while the clutch is in engaged condition, said force being applied in a direction to release the clutch such that pending the release of torque on the clutch itself the releasing force is ready to move the clutch to released position, and means for relieving the torque on the clutch when the releasing force is established, said torque-relieving means comprising a normally broken circuit in parallel with the ignition circuit, means for establishing the circuit, and mechanical means controlling the circuit establishing means.

60. In a motor vehicle power transmission, a drive shaft adapted to receive drive from the vehicle motor, a driven shaft adapted to drive said vehicle, a toothed clutch member on said drive shaft, a toothed clutch member on said driven shaft, shiftable toothed means normally biased into interengagement with at least one of said toothed clutch members for effecting a drive connection between said clutch members to establish direct drive between said shafts, means for driving said driven shaft from said drive shaft at a reduced speed with respect thereto, said last means including an overrunning device having a driving member driven by the drive shaft and a driven member drivingly associated with said driven shaft, driver controlled means power operated for disengaging said shiftable toothed means from said one clutch member to establish reduced speed drive between said shafts, and means operable from a condition of disengagement of said shiftable toothed means for limiting coast of said drive shaft to the speed of said driven shaft upon release of said reduced speed drive whereby to allow drive of the transmission by the driven shaft and thereby facilitate interengagement of the said one clutch member and said releasable toothed means to re-establish direct drive.

61. In a motor vehicle power transmission, a fluid power transmitting device adapted to receive drive from the vehicle motor, a drive shaft arranged to receive drive from the fluid device, a driven shaft adapted to drive the vehicle, a clutch member on said drive shaft, a clutch member on said driven shaft, releasable means for positively clutching said clutch members together to establish direct drive between said drive and driven shafts, means for driving said driven shaft from said drive shaft at a reduced speed with respect thereto, said last means including an overrunning device having a driving member driven by said drive shaft and a driven member drivingly associated with said driven shaft, driver controlled electrically powered means for releasing said releasable clutching means to establish reduced speed drive between said shafts and including resilient means for restoring said clutching means to direct drive position upon release of said reduced speed drive, and means operably arranged between said drive and driven shafts for facilitating engagement of said clutch members from a condition of asynchronism upon release of said reduced speed drive.

62. In a power transmission having an engine; a driving structure adapted to receive drive from the engine, a driven structure adapted to receive drive from the driving structure for driving the vehicle, change speed mechanism operably connecting said structures, means for manipulating said change speed mechanism for effecting at least two different speed ratio drives between said structures, one of which is a faster speed ratio drive than the other, control means operable independently of vehicle speed when the vehicle is conditioned in the faster of said speed ratio drives for producing automatic operation of said manipulating means to effect a stepdown from the faster to the slower of said speed ratio drives between said structures, and speed responsive means operable at or below a predetermined vehicle speed when the vehicle is conditioned in said faster speed ratio drive to prevent said stepdown by operation of said control means.

63. In a power transmission having an engine provided with an ignition system; a driving structure adapted to receive drive from the engine, a driven structure adapted to receive drive from the driving structure for driving the vehicle, change speed mechanism operably connecting said structures, means for manipulating said change speed mechanism for effecting at least two different speed ratio drives between said structures, one of which drives is faster than the other, means for automatically establishing the slower of said two drives upon release of the faster thereof, means operable by said manipulating means for interrupting the operation of said ignition system, means operable independently of vehicle speed when the vehicle is conditioned in said faster drive ratio for causing operation of said manipulating means and operation of said ignition system interrupting means by the latter whereby to interrupt the ignition system and effect a stepdown from said faster to the slower of said two speed ratio drives, and speed responsive means operable at or below a predetermined vehicle speed when said transmission is condition in said faster speed ratio drive for preventing said ignition interruption and stepdown in said drive ratio.

64. In a power transmission having an engine, a driving structure adapted to receive drive from said engine, a driven structure adapted to receive drive from the driving structure, change speed mechanism operably connecting said structures, said mechanism including positively interengageable drive control elements normally engaged for establishing one speed ratio drive between said structures and means operable upon disengagement thereof to effect a downshift to a slower speed ratio drive, means for effecting disengagement of said speed control elements, and control means responsive to vehicle speed operable to prevent said downshift at or below a predetermined vehicle speed when said drive control elements are engaged in said one drive.

65. In a power transmission having an engine, a fluid power transmitting device for receiving drive from the engine, a driving structure adapted to receive drive from said fluid device, a driven structure adapted to receive drive from the driving structure for driving the vehicle, change speed mechanism operably connecting said structures, said mechanism including positively engageable drive control elements normally engaged for establishing one speed ratio drive between said structures and means operable upon disengagement thereof to effect a downshift to a slower speed ratio drive, means for effecting disengagement of said speed control elements, and control means responsive to vehicle speed operable to prevent said downshift at or below a predetermined vehicle speed when said drive control elements are engaged whereby to avoid stalling of the engine by said fluid device.

66. In a motor vehicle driving system including an engine, a throttle control therefor, a transmission including positively interengageable elements adapted when engaged, to transmit drive of one ratio, means to automatically establish a drive of a different ratio upon disengagement of said elements, one of said elements being movable in opposite directions for establishing and releasing such engagement, solenoid means energizable for actuating said one element to disengaged position, spring means adapted when said solenoid means is de-energized to move said one element to engaged position, torque unloading means for facilitating disengagement of said elements, and vehicle speed responsive means for controlling energization of said solenoid means.

67. A transmission for connecting a driving shaft to a driven shaft comprising an infinitely variable speed driving unit driven by the driving shaft; and a countershaft type change speed unit drivingly connected to the driven shaft; said countershaft unit including an input drive gear and said transmission including a pair of telescoped coaxial shafts for drive connection with said countershaft unit each adapted to receive drive from said driving shaft, one of said coaxial shafts directly connecting with said input drive gear and the other being drivingly connectible with said drive gear by means including releasable clutching means.

68. A transmission for connecting a driving shaft to a driven shaft comprising a pair of telescoping coaxial shafts adapted to receive drive from said driving shaft; means including fluid power transmitting means connecting at least one of said coaxial shafts to said driving shaft; means including a countershaft power gear train and a one-way clutch for drivingly connecting one of said pair of coaxial shafts to said driven shaft and means including a releasable clutch for drivingly connecting the other of said pair of coaxial shafts to said driven shaft.

69. A transmission for connecting a driving shaft to a driven shaft comprising, a pair of telescoping coaxial shafts each adapted to receive drive from said driving shaft; means including fluid power transmitting means for connecting at least one of said coaxial shafts to said driving shaft; a driving gear on one of said coaxial shafts; a countershaft paralleling said coaxial shafts; a gear on said countershaft meshing with said driving gear; a gear train including a one-way clutch drivingly connecting said countershaft gear and said driven shaft; and means including a clutch drivingly connecting said coaxial shaft not having said driving gear, to said driven shaft.

70. A transmission for connecting a driving shaft to a driven shaft comprising an infinitely variable speed driving unit connected to the driving shaft to be driven thereby; a driving gear driven by said unit; a countershaft parallel to the driven shaft; a gear on the countershaft meshing with said driving gear; a gear train including a one-way clutch drivingly connecting said countershaft gear and said driven shaft; means including a releasable clutch for effecting a direct speed ratio drive between said driving shaft and driven shaft; and means controlling operation of said releasable clutch.

71. In a motor vehicle driving system including an engine, and a throttle control therefor, a transmission including positively interengageable coaxial multi-toothed elements adapted when interengaged, to establish a drive of one ratio, means to automatically establish a drive of a different ratio upon disengagement of said elements, one of said elements being movable axially in opposite directions for establishing and releasing such interengagement, electro-magnetic means operable when energized to effect movement of said one element in one direction of said movement, yieldable means adapted when said electro-magnetic means is deenergized to move said one element in the other direction of said movement, and means for controlling energization of said electro-magnetic means, said controlling means including a governor, a switch operable by said governor and throttle control operated switch means operable independently of said governor.

72. In a motor vehicle driving system including an engine having an ignition circuit, and a throttle control, a transmission including positively interengageable coaxial multi-toothed drive control elements one of which is movable into engagement with the other for establishing a drive of one ratio, said elements when interengaged being subject to thrust transmission therebetween during said drive of one ratio so as to resist disengagement of said elements to release this drive until the drive torque on said elements is unloaded, means operable to automatically establish a drive of a lower ratio upon disengagement of said elements incident to disengaging movement of said one element, yieldable means biasing said one element in one direction of its movement, a second yieldable means, a solenoid operable when energized to actuate said second yieldable means for effecting bias of said one element in the other direction of its movement, vehicle speed responsive means for controlling energization of said solenoid, manually operable switch means associated with the throttle control for controlling energization of said solenoid, means for rendering the ignition circuit of said engine inoperative so as to unload said drive torque and thereby facilitate the disengagement of said elements, said last means including said throttle associated switch means and a switch associated with said solenoid, means operable to close said last named switch, and other means operable incident to disengagement of said elements for opening said last mentioned switch.

73. In a power transmission for an automotive vehicle having an engine, a driving shaft adapted to receive a drive from the engine, a driven shaft adapted to drive the vehicle, a relatively slow speed driving means for driving said driven shaft from said driving shaft, a relatively fast speed driving means for driving said driven shaft at a speed greater than that of the slow speed driving means and including positively interengageable drive control elements adapted when engaged to establish said fast speed drive, one of said elements being movable in opposite directions for establishing and releasing such interengagement, said relatively slow speed driving means including a control device operating automatically to establish this drive in response to the release of said elements, a motor operable when energized to effect movement of said one element in one direction of said movement, yieldable means adapted when said motor is deenergized to move said one element in the other direction of said movement, means for controlling energization of said motor, and speed responsive means for controlling said motor control means.

74. The invention set forth in claim 73 wherein the speed responsive means actuates said motor control means at predetermined vehicle speed.

75. The invention set forth in claim 73 and driver controlled means for interrupting the delivery of power from the engine and for so controlling energization of said motor to enable release of said engageable element and establishment of slow speed drive.

76. In a power transmission for an automotive vehicle having an engine, a driving shaft adapted to receive a drive from the engine, a driven shaft adapted to drive the vehicle, a relatively slow speed driving means for driving said driven shaft from said driving shaft, a relatively fast speed driving means for driving said driven shaft at a speed greater than that of the slow speed driving means and including positively interengageable drive control elements adapted when engaged to establish said fast speed drive, one of said elements being movable in opposite directions for establishing and releasing such interengagement, said relatively slow speed driving means including a control device operating automatically to establish this drive in response to the release of said elements, yieldable means, a motor operable when energized upon said yieldable means to effect movement therethrough of said one element in one direction of said movement, a second yieldable means adapted when said motor is deenergized to move said one element in the other direction of said movement, means for controlling energization of said motor, and speed responsive means for controlling said motor control means.

77. In a power transmission for driving a vehicle having an engine provided with an ignition system; means including a pair of interengageable elements operable to effect a change in the transmission speed ratio; electromagnet operated means for controlling operation of said change speed means; electrical circuit means for controlling said electromagnet including a source of power for energizing said electromagnet; speed controlled means in part of said circuit means for controlling energization and deenergization of said electromagnet; a control element operable by the vehicle driver; switch means in part of said circuit means operable in response to operation of said control element for controlling energization of said electromagnet and switch means in electrical circuit with said ignition system operable by said electromagnet and by the disengagement of said interengageable elements for momentarily interrupting the ignition system.

78. In a power transmission for an automotive vehicle having an engine; a driving shaft adapted to receive drive from the engine; a driven shaft adapted to drive the vehicle; means including positively interengageable drive control elements adapted, when interengaged, to establish a drive relationship between said shafts; one of said elements being movable in opposite directions for establishing and releasing such interengagement; motor means having a power element operable upon energization of said motor means for moving said one control element in one direction of its said movement; yieldable means adapted when said motor is deenergized to bias said one control element in the other direction of its said movement; a source of power for the motor means; motor control means; and speed responsive means operated independently of said power source for actuating said motor control means for controlling energization of said motor means by power from said power source.

79. In a motor vehicle driving system including an engine and a throttle control therefor, a transmission including positively interengageable elements adapted when engaged to establish a drive of one ratio, means to automatically establish a drive of a different ratio upon disengagement of said elements, one of said elements being movable in opposite directions for establishing and releasing such engagement, electromagnetic means operable when energized to effect movement of said one element in one direction of said movement, yieldable means adapted when said electromagnetic means is deenergized to move said one element in the other direction of said movement, electrical circuit means for said electromagnetic means, governor means including switch means in said circuit means for controlling engagement and disengagement of said elements, and switch means in said circuit means operable by said throttle control for controlling engagement and disengagement of said elements.

80. In a motor vehicle driving system including an engine provided with an electrical ignition circuit and a driver operable engine throttle control, a transmission including positively interengageable elements adapted when engaged to establish a drive of one ratio, means to automatically establish a drive of a different ratio upon disengagement of said elements, one of said elements being movable in opposite directions for establishing and releasing such engagement, electromagnetic means operable when energized to effect movement of said one element in one direction of said movement, yieldable means adapted when said electromagnetic means is deenergized to move said one element in the other direction of said movement, electrical circuit means for said electromagnetic means, and means for controlling the operation of said electromagnetic means for effecting engagement and disengagement of said elements and of said ignition circuit for effecting momentary interruption thereof for facilitating disengagement of said elements, comprising a governor, and a plurality of switch means including one in said circuit means under control of said governor and a second in said circuit means under control of said driver operable throttle control.

81. In a motor vehicle driving system including an engine provided with an electrical ignition circuit and a driver operable engine throttle control, a transmission including positively interengageable elements adapted when engaged to establish a drive of one ratio, means to automatically establish a drive of a different ratio upon disengagement of said elements, one of said elements being movable in opposite directions for establishing and releasing such engagement, electromagnetic means operable when energized to effect movement of said one element in one direction of said movement, yieldable means adapted when said electromagnetic means is deenergized to move said one element in the other direction of said movement, electrical circuit means for said electromagnetic means, and means for controlling the operation of said electromagnetic means for controlling the engagement and disengagement of said elements including a governor, a first switch means in said circuit means operable by said governor, a second switch means in said circuit means operable under control of said throttle control and third switch means operable under control of said electromagnetic means for controlling momentary interruption of said ignition circuit to facilitate disengagement of said elements.

82. In a motor vehicle driving system, a throttle control, a drive control member adapted when engaged to transmit drive of one ratio, means to automatically establish a drive of a lower ratio upon release of said member, positively interengageable elements one of which is movable into engagement with the other for establishing said engagement of the drive control member, yielding means biasing said one element in one direction of its movement, a solenoid for biasing said one element in the other direction of its movement, speed responsive means for automatically controlling said solenoid, means including a switch operably associated with the throttle control for manually controlling said solenoid, means for rendering the ignition circuit of said engine inoperative so as to facilitate the disengagement of said elements, said last means including said throttle controlled switch and a switch associated with said solenoid, and means responsive to disengagement of said elements for opening said last mentioned switch.

83. In a motor vehicle driving system, a throttle control therefor, a drive control member adapted when engaged to transmit drive of one ratio, means to automatically establish a drive of a lower ratio upon release of said member, a peripheral tooth structure in fixed relation to said member, a movable element having a tooth structure adapted to coact with said peripheral tooth structure for establishing said engagement of said drive control member, yielding means biasing said movable element in one direction of its movement, a solenoid for biasing said movable element in the other direction of its movement, means for rendering the ignition circuit of said engine inoperative so as to facilitate the disengagement of said tooth structures said last means including a throttle controlled switch and a switch associated with said solenoid, means responsive to movement of said movable element to disengaged position for opening said last mentioned switch, and means including a governor for controlling the operation of said solenoid.

84. In a motor vehicle transmission having gearing, control mechanism for said gearing including a shiftable member operable to be moved to a position engaged with or released from one element of said gearing, solenoid means operable when energized for shifting said member to one of said positions, spring means operable when said solenoid is deenergized for moving said shiftable member to the other of said positions, an electrical circuit for said solenoid means, a plurality of switches operable to open and close the circuit of said solenoid means, accelerator operable means for controlling one of said plurality of switches, speed responsive means for controlling another of said plurality of switches, and hand-operated means operable independently of said accelerator and speed responsive switches for controlling said shiftable member.

85. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said relatively slow speed driving means including a control device operating automatically to establish this drive in response to release of said relatively fast speed driving means, electromagnetic means for biasing said interengaging elements into position for effecting one of said drives, and a speed responsive governor for controlling the operation of said electromagnetic means and operable when the speed of one of said shafts reaches a predetermined point.

86. In a motor vehicle driving system including an engine having an ignition system, a throttle control therefor, a transmission including positively interengageable elements adapted when engaged to establish a drive of one ratio, means to automatically establish a drive of a different ratio upon disengagement of said elements, one of said elements being movable in opposite directions for establishing and releasing such engagement, electro-magnetic means adapted when energized to effect movement of said one element in one direction of said movement, yielding means adapted when said electro-magnetic means is deenergized to move said one element in the other direction of said movement, and means for controlling the operation of said electro-magnetic means, said controlling means including a governor for automatic control of the engagement and disengagement of said elements and including manually operated means for controlling the disengagement of said elements independently of said governor, and means controlled by said manually operated means for rendering inoperative the ignition system of said engine so as to facilitate said disengagement.

87. In a motor vehicle driving system including an engine having an ignition circuit, a throttle control, positively interengageable drive control elements one of which is movable into engagement with the other for establishing a drive of one ratio, said elements when engaged being subject to thrust transmission therebetween during said drive of one ratio so as to resist disengagement of said elements to release this drive until the drive torque on said elements is unloaded, means operable to automatically establish a drive of a lower ratio upon disengagement of said elements incident to disengaging movement of said one element, yielding means biasing said one element in one direction of its movement, a solenoid for effecting bias of said one element in the other direction of its movement, vehicle speed responsive means for controlling said solenoid, a manually operable switch associated with the throttle control for controlling said solenoid, means for rendering the ignition circuit of said engine inoperative so as to unload said drive torque and thereby facilitate the disengagement of said elements, said last means including said throttle associated switch and a switch associated with said solenoid, and means operable incident to disengagement of said elements for opening said last mentioned switch.

88. In a motor vehicle driving system including an engine having an ignition system; a throttle control, a drive control member having a peripheral tooth structure in fixed relation thereto, a second drive control member having a tooth structure interengageable with the tooth structure of said first mentioned drive control member, one of said members being movable relative to the other into positions of engagement and disengagement of said tooth structures, said members adapted when said tooth structures are engaged to transmit a drive of one ratio, said members when said tooth structures are engaged being subject to thrust transmission therebetween during said drive of one ratio so as to resist disengagement of said tooth structures to release this drive until the drive torque on said members is unloaded, means operable to automatically establish a drive of a lower ratio upon disengagement of said tooth structures, yielding means biasing said movable member in one direction of its movement, a solenoid for effecting bias of said movable member in the other direction of its movement, means for rendering the ignition system of said engine inoperative so as to unload said drive torque and thereby facilitate disengagement of said tooth structures, said last means including a throttle controlled switch and a switch associated with said solenoid; means operable incident to movement of said movable member to disengaged position of said tooth structures for opening said last mentioned switch, and governor means for controlling the operation of said solenoid.

89. In a motor vehicle driving system including an engine, a throttle control therefor, a transmission including positively interengageable elements adapted when engaged to establish a fast speed ratio drive, said elements when engaged being subject to thrust transmission therebetween during said fast speed ratio drive so as to resist disengagement of said elements to release this drive until the drive torque in said transmission is unloaded, means for establishing a slower speed ratio drive upon disengagement of said elements, one of said elements being movable in opposite directions for establishing and releasing such engagement, solenoid means energizable for operating said movable element in one direction, spring means for moving said movable element in the opposite direction, torque unloading means to facilitate disengagement of said elements and vehicle speed responsive means for controlling energization of said solenoid means.

90. In a motor vehicle power transmission, a hydraulic power transmitting device having a fluid circuit in which are positioned a rotatable vaned impeller adapted to receive drive from the motor of said vehicle and a vaned driven member arranged to receive circulating fluid in said circuit, a power output member, torque multiplying gear means in drive transmitting relationship with said power output member and with a driven member of said hydraulic device and adapted to drive said output member at a plurality of different speed ratios, manual means operable for controlling the establishment of neutral, reverse speed ratio and a plurality of forward speed ratios in said gear means, holding means including a member having a holding position and a released position and operable in one of said positions for facilitating the obtaining of one of said speed ratios by said manually operable means and control means operably responsive to vehicle speed for controlling operation of said holding means whereby said speed ratio may be effected by said manually operable means only when the vehicle is at rest and when proceeding at any speed from rest and up to a slow rate of speed.

91. In a motor vehicle power transmission, a hydraulic power transmitting device having a fluid circuit in which are positioned a rotatable vaned impeller adapted to receive drive from the motor of said vehicle and a vaned driven member arranged to receive the circulating fluid from the impeller, a fluid pump in driving connection with the motor, change speed means comprising a planetary gearset in drive transmitting relationship with a driven member of said hydraulic device, said gearset including sun gear, ring gear and planet gear carrier elements, brake means operable for holding one of said elements of said planetary gearset incident to effecting a predetermined speed ratio in said change speed means, a power output member, means providing drive transmission between said power output member and a second of said elements of said planetary gearset, pressure fluid operated means adapted to receive pressure fluid from said pump for effecting operation of said brake means, control means for controlling the admission of pressure fluid to said fluid operated means, and means responsive to vehicle speed adapted to control operation of said control means for said brake operation effecting means whereby the latter is operable to effect holding of said one planetary element only when the vehicle is at rest and when proceeding at any speed from rest up to a slow rate of speed.

92. In a motor vehicle power transmission, a hydraulic power transmitting device having a fluid circuit in which are positioned a rotatable vaned impeller adapted to receive drive from the motor of said vehicle and a plurality of rotatable vaned driven members arranged to receive the circulating fluid from the impeller, a fluid pump in driving connection with the motor for supplying fluid under pressure to said hydraulic device, change speed means comprising a planetary gearset in drive transmitting relationship with a driven member of said hydraulic device, said gearset including sun gear, ring gear and planet gear carrier elements, brake means operable for holding one of said elements of said planetary gearset incident to effecting a predetermined speed ratio in said change speed means, a power output member, means providing drive transmission between said power output member and a second of said elements of said planetary gearset, pressure fluid operated means for effecting operation of said brake means, control means for controlling the admission of pressure fluid to said fluid operated means, and means responsive to vehicle speed adapted to control operation of said control means for said brake operation effecting means whereby the latter is operable to effect holding of said one planetary element only when the vehicle is at rest and when proceeding at any speed from rest up to a slow rate of speed.

93. In a motor vehicle power transmission, a hydraulic power transmitting device having a fluid circuit in which are positioned a rotatable vaned impeller adapted to receive drive from the motor of said vehicle and a plurality of rotatable vaned driven members arranged to receive the circulating fluid from the impeller, a fluid pump in driving connection with the motor for supplying fluid under pressure to said hydraulic device, change speed means comprising a planetary gearset in drive transmitting relationship with a driven member of said hydraulic device, said gearset including sun gear, ring gear and planet gear carrier elements, brake means operable for holding one of said elements of said planetary gearset incident to effecting a predetermined speed ratio in said change speed means, a power output member, means providing drive transmission between said power output member and a second of said elements of said planetary gearset, pressure fluid operated means for effecting operation of said brake means, control means including a valve for controlling said pressure fluid operated means and means responsive to vehicle speed adapted to control operation of said control means for said brake operation effecting means whereby the latter is operable to effect holding of said planetary element only when the vehicle is at rest and when proceeding at any speed from rest up to a slow rate of speed.

94. In a motor vehicle power transmission, a hydraulic power transmitting device having a fluid circuit in which are positioned a rotatable vaned impeller adapted to receive drive from the motor of said vehicle and a plurality of rotatable vaned driven members arranged to receive the circulating fluid from the impeller, a fluid pump in driving connection with the motor for supplying fluid under pressure to said hydraulic device, change speed means comprising a planetary gearset in drive transmitting relationship with a driven member of said hydraulic device, said gearset including sun gear, ring gear and planet gear carrier elements, brake means operable for holding one of said elements of said planetary gearset incident to effecting a predetermined speed ratio in said change speed means, a power output member, means providing drive transmission between said power output member and a second of said elements of said planetary gearset, pressure fluid operated means adapted to receive pressure fluid from said pump for effecting operation of said brake means, control means including a valve for controlling said pressure fluid operated means, and means responsive to vehicle speed adapted to control operation of said control means for said brake operation effecting means whereby the latter is operable to effect holding of said one planetary element only when the vehicle is at rest and during acceleration from rest up to a slow rate of speed.

95. In a motor vehicle power transmission, a hydraulic power transmitting device having a fluid circuit in which are positioned a rotatable vaned impeller adapted to receive drive from the motor of said vehicle and a plurality of rotatable vaned driven members arranged to receive the circulating fluid from the impeller, a fluid pump in driving connection with the motor for supplying fluid under pressure to said hydraulic device, change speed means comprising a planetary gear set in drive transmitting relationship with a driven member of said hydraulic device, said gearset including sun gear, ring gear and planet gear carrier elements, brake means operable for holding one of said elements of said planetary gearset incident to effecting a predetermined speed ratio in said change speed means, a power output member, means providing drive transmission between said power output member and a second of said elements of said planetary gearset, fluid pressure operated means for operating said brake means, control means including a valve for controlling said brake operating means, and means responsive to vehicle speed including a second fluid pump for controlling operation of said valve whereby said brake operating means is operable to effect holding of said planetary element by said brake means only when the vehicle is at rest or when proceeding at any speed from rest up to a slow rate of speed.

96. In a motor vehicle power transmission, a power input member adapted to receive drive from the motor of said vehicle, a power output member adapted to drive the vehicle, fluid power transmitting means drivingly connected with said power input member and adapted to transmit power from the motor for driving said output member, a fluid pump drivingly connected with said power input member, means for supplying fluid under pressure from said pump to said fluid power transmitting means, torque multiplying gear means drivingly connected with said fluid power transmitting means and with said power output member and adapted to drive said output member at a plurality of different forward drive speed ratios, means operable to effect a speed ratio change in said gear means, fluid actuated means for controlling operation of said speed ratio change means, and fluid operating means responsive to the speed of the vehicle for controlling said fluid actuated means.

References Cited in the file of this patent

UNITED STATES PATENTS

| Re. 21,385 | Cotterman | Mar. 12, 1940 |
|---|---|---|
| 796,989 | Enrico | Aug. 15, 1905 |
| 1,124,280 | Brackett | Jan. 12, 1915 |
| 1,185,528 | Oddie | May 30, 1916 |
| 1,432,432 | Warnock | Oct. 17, 1922 |
| 1,599,123 | Fay | Sept. 7, 1926 |
| 1,731,076 | Maurer | Oct. 8, 1929 |
| 1,766,520 | Klimek | June 24, 1930 |
| 1,886,003 | Garrison | Nov. 1, 1932 |
| 1,911,599 | Bloxsom | May 30, 1933 |

(Other references on following page)

UNITED STATES PATENTS

| Number | Name | Date |
|---|---|---|
| 1,942,198 | Blackstock | Jan. 2, 1934 |
| 1,950,163 | Cotterman | Mar. 6, 1934 |
| 1,953,568 | Rose | Apr. 3, 1934 |
| 1,974,267 | Galloway | Sept. 18, 1934 |
| 1,977,007 | Nardone | Oct. 16, 1934 |
| 1,978,172 | Sinclair | Oct. 23, 1934 |
| 1,983,955 | Von Soden-Fraunhofen | Dec. 11, 1934 |
| 2,008,231 | Vincent | July 16, 1935 |
| 2,012,082 | Hieber et al. | Aug. 20, 1935 |
| 2,012,083 | Schellenbach | Aug. 20, 1935 |
| 2,016,835 | Nardone et al. | Oct. 8, 1935 |
| 2,019,174 | Clark | Oct. 29, 1935 |
| 2,051,553 | Fleischel | Aug. 18, 1936 |
| 2,055,895 | Fawcett | Sept. 29, 1936 |
| 2,062,104 | Prince | Nov. 24, 1936 |
| 2,070,215 | Nardone | Feb. 9, 1937 |
| 2,071,785 | Ehrlich | Feb. 23, 1937 |
| 2,084,219 | Salerni | June 15, 1937 |
| 2,090,614 | Clark | Aug. 24, 1937 |
| 2,098,691 | Neff | Nov. 9, 1937 |
| 2,100,191 | Lapsley | Nov. 23, 1937 |
| 2,104,605 | Boldt | Jan. 4, 1938 |
| 2,104,608 | Cox et al. | Jan. 4, 1938 |
| 2,106,607 | Kelley | Jan. 25, 1938 |
| 2,114,179 | Fottinger | Apr. 12, 1938 |
| 2,118,978 | Maybach | May 31, 1938 |
| 2,133,548 | Lassiter | Oct. 18, 1938 |
| 2,149,117 | Dodge | Feb. 28, 1939 |
| 2,151,722 | Szekely | Mar. 28, 1939 |
| 2,166,866 | Hansen | July 18, 1939 |
| 2,170,538 | Sarver | Aug. 22, 1939 |
| 2,170,649 | Banker | Aug. 22, 1939 |
| 2,181,541 | Barkeij | Nov. 28, 1939 |
| 2,183,761 | Aspinwall et al. | Dec. 19, 1939 |
| 2,203,177 | Patterson | June 4, 1940 |
| 2,222,618 | Jandasek | Nov. 26, 1940 |
| 2,225,493 | Barnes | Dec. 17, 1940 |
| 2,236,657 | Webb | Apr. 1, 1941 |
| 2,239,129 | Szekely | Apr. 22, 1941 |
| 2,250,656 | Schjolin | July 29, 1941 |
| 2,255,020 | Barnes | Sept. 2, 1941 |
| 2,258,475 | Sinclair | Oct. 7, 1941 |
| 2,258,684 | Lysholm et al. | Oct. 14, 1941 |
| 2,262,747 | Banker | Nov. 18, 1941 |
| 2,276,862 | Peterson et al. | Mar. 17, 1942 |
| 2,311,740 | Dodge | Feb. 23, 1943 |
| 2,322,479 | Schjolin | June 22, 1943 |
| 2,343,304 | La Brie | Mar. 7, 1944 |

FOREIGN PATENTS

| Number | Country | Date |
|---|---|---|
| 430,938 | Germany | June 25, 1926 |
| 433,279 | Great Britain | May 7, 1934 |
| 457,269 | Great Britain | Nov. 24, 1936 |

UNITED STATES PATENT OFFICE
CERTIFICATE OF CORRECTION

Patent No. 2,916,932                              December 15, 1959

Herbert F. Patterson

It is hereby certified that error appears in the printed specification of the above numbered patent requiring correction and that the said Letters Patent should read as corrected below.

Column 1, line 34, for "aceclerator" read -- accelerator --; column 2, line 5, for "types" read -- type --; column 5, line 18, for "through" read -- throw --; column 8, line 26, for "by" read -- of --; column 15, line 63, and column 16, line 15, for "10", each occurrence, read -- 110 --; column 17, line 24, for "inot" read -- into --; same column 17, line 62, for "199" read -- 197 --; line 63, for "197" read -- 199 --; column 19, line 17, for "incident to" read -- after --; line 19, beginning with "upon" strike out all to and including "of said members," in lines 23 and 24; line 59, for "trottle" read -- throttle --; column 21, line 25, after "engagement", first occurrence, insert a comma; column 29, line 35, for "subjected" read -- subject --; column 31, lines 20 and 21, strike out "including a multiple rotor fluid coupling having reduction gearing between certain rotors", and insert the same after "means", in line 17, same column; same column 31, lines 39 and 40, strike out "including a multiple rotor fluid coupling having reduction gearing between certain rotors" and insert the same after "means" in line 36, same column; line 75, for "all" read -- are --; column 32, line 19, after "provide" insert -- for --; column 33, line 16, before "clutch" insert -- rotatable --; line 71, for "drive" read -- driver --; column 36, line 40, for "condition" read -- conditioned --.

Signed and sealed this 30th day of August 1960.

(SEAL)
Attest:

ERNEST W. SWIDER
Attesting Officer

ROBERT C. WATSON
Commissioner of Patents